United States Patent
Kobayashi et al.

(10) Patent No.: US 10,363,807 B2
(45) Date of Patent: Jul. 30, 2019

(54) CONTROL DEVICE

(71) Applicant: AISIN AW CO., LTD., Anjo-shi, Aichi-ken (JP)

(72) Inventors: Hirokazu Kobayashi, Anjo (JP); Takashi Yoshida, Anjo (JP); Kohei Tsuda, Nishio (JP)

(73) Assignee: AISIN AW CO., LTD., Anjo (JP)

( * ) Notice: Subject to any disclaimer, the term of this patent is extended or adjusted under 35 U.S.C. 154(b) by 208 days.

(21) Appl. No.: 15/547,678

(22) PCT Filed: Mar. 18, 2016

(86) PCT No.: PCT/JP2016/058812
§ 371 (c)(1),
(2) Date: Jul. 31, 2017

(87) PCT Pub. No.: WO2016/158521
PCT Pub. Date: Oct. 6, 2016

(65) Prior Publication Data
US 2018/0009308 A1 Jan. 11, 2018

(30) Foreign Application Priority Data

Mar. 27, 2015 (JP) ................................. 2015-067592

(51) Int. Cl.
*B60K 6/00* (2006.01)
*B60K 6/48* (2007.10)
(Continued)

(52) U.S. Cl.
CPC ................ *B60K 6/48* (2013.01); *B60L 15/20* (2013.01); *B60L 50/16* (2019.02); *B60W 10/02* (2013.01);
(Continued)

(58) Field of Classification Search
CPC ........... B60K 6/48; B60L 50/16; B60L 15/20; B60W 10/02; B60W 10/06; B60W 10/08;
(Continued)

(56) References Cited

U.S. PATENT DOCUMENTS

2007/0080005 A1* 4/2007 Joe ........................... B60K 6/48
180/65.245
2012/0115676 A1* 5/2012 Schiele ..................... B60K 6/48
477/5

(Continued)

FOREIGN PATENT DOCUMENTS

JP 2007-099141 A 4/2007
JP 2011-195119 A 10/2011
(Continued)

OTHER PUBLICATIONS

Jun. 7, 2016 International Search Report issued in Patent Application No. PCT/JP2016/058812.

*Primary Examiner* — Hieu T Vo
*Assistant Examiner* — Sherman D Manley
(74) *Attorney, Agent, or Firm* — Oliff PLC

(57) ABSTRACT

A control device for performing start assist control for an internal combustion engine includes: a first start assist processing unit that executes a first start assist process that brings a first engagement device into slip engagement at a first engagement pressure while increasing a torque generated by a rotating electrical machine; and a second start assist processing unit that increases, when the first start assist process fails to start the internal combustion engine, an engagement pressure of the first engagement device to a second engagement pressure higher than the first engagement pressure while increasing the torque generated by the rotating electrical machine. The second start assist processing unit determines the second engagement pressure on the (Continued)

basis of a rotational speed of the internal combustion engine in the first start assist process.

7 Claims, 12 Drawing Sheets

(51) Int. Cl.
| | | |
|---|---|---|
| | *B60L 15/20* | (2006.01) |
| | *B60W 10/02* | (2006.01) |
| | *B60W 10/08* | (2006.01) |
| | *B60W 20/40* | (2016.01) |
| | *B60W 10/06* | (2006.01) |
| | *B60L 50/16* | (2019.01) |

(52) U.S. Cl.
CPC ............ *B60W 10/06* (2013.01); *B60W 10/08* (2013.01); *B60W 20/40* (2013.01); *B60W 2510/0642* (2013.01); *Y02T 10/6221* (2013.01); *Y02T 10/6286* (2013.01); *Y02T 10/7077* (2013.01); *Y02T 10/7275* (2013.01)

(58) Field of Classification Search
CPC .......... B60W 20/40; B60W 2010/0642; Y02T 10/6286; Y02T 10/6221; Y02T 10/7077; Y02T 10/7275

See application file for complete search history.

(56) References Cited

U.S. PATENT DOCUMENTS

| | | | |
|---|---|---|---|
| 2013/0296111 A1* | 11/2013 | Nedorezov | B60W 20/00 477/5 |
| 2015/0006063 A1* | 1/2015 | Takahashi | B60K 6/48 701/110 |
| 2015/0266468 A1* | 9/2015 | Moon | B60W 20/40 701/22 |
| 2015/0307085 A1* | 10/2015 | Gotoda | B60W 10/06 701/22 |

FOREIGN PATENT DOCUMENTS

| | | |
|---|---|---|
| JP | 2013-208970 A | 10/2013 |
| JP | 2015-020702 A | 2/2015 |

* cited by examiner

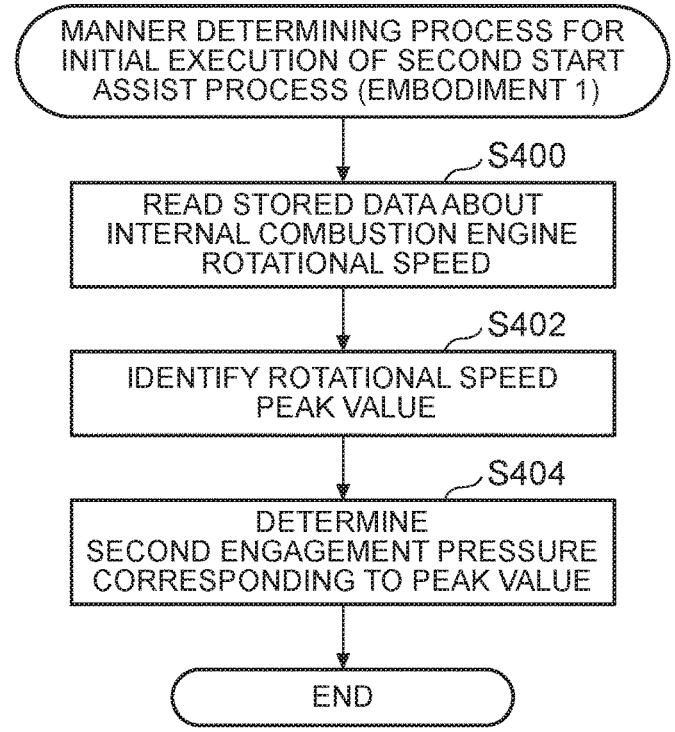
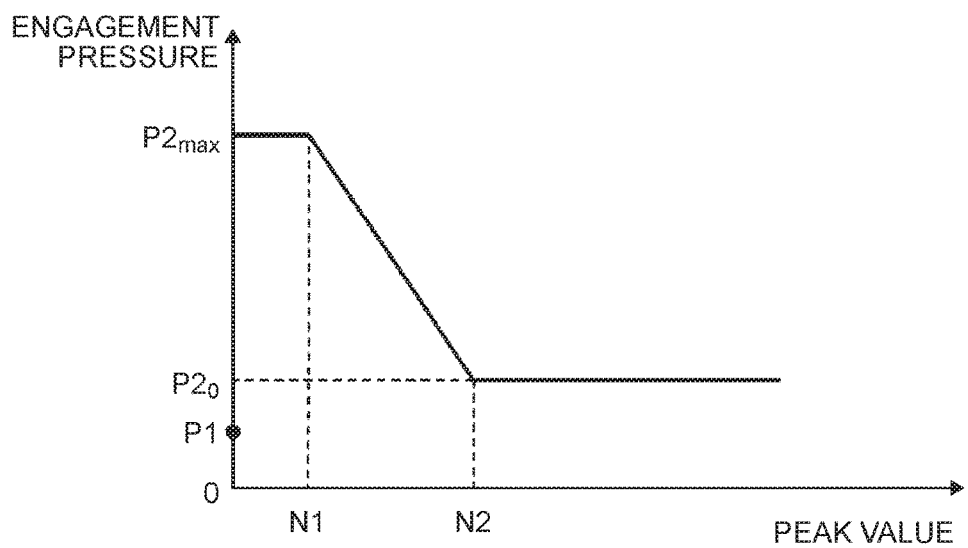

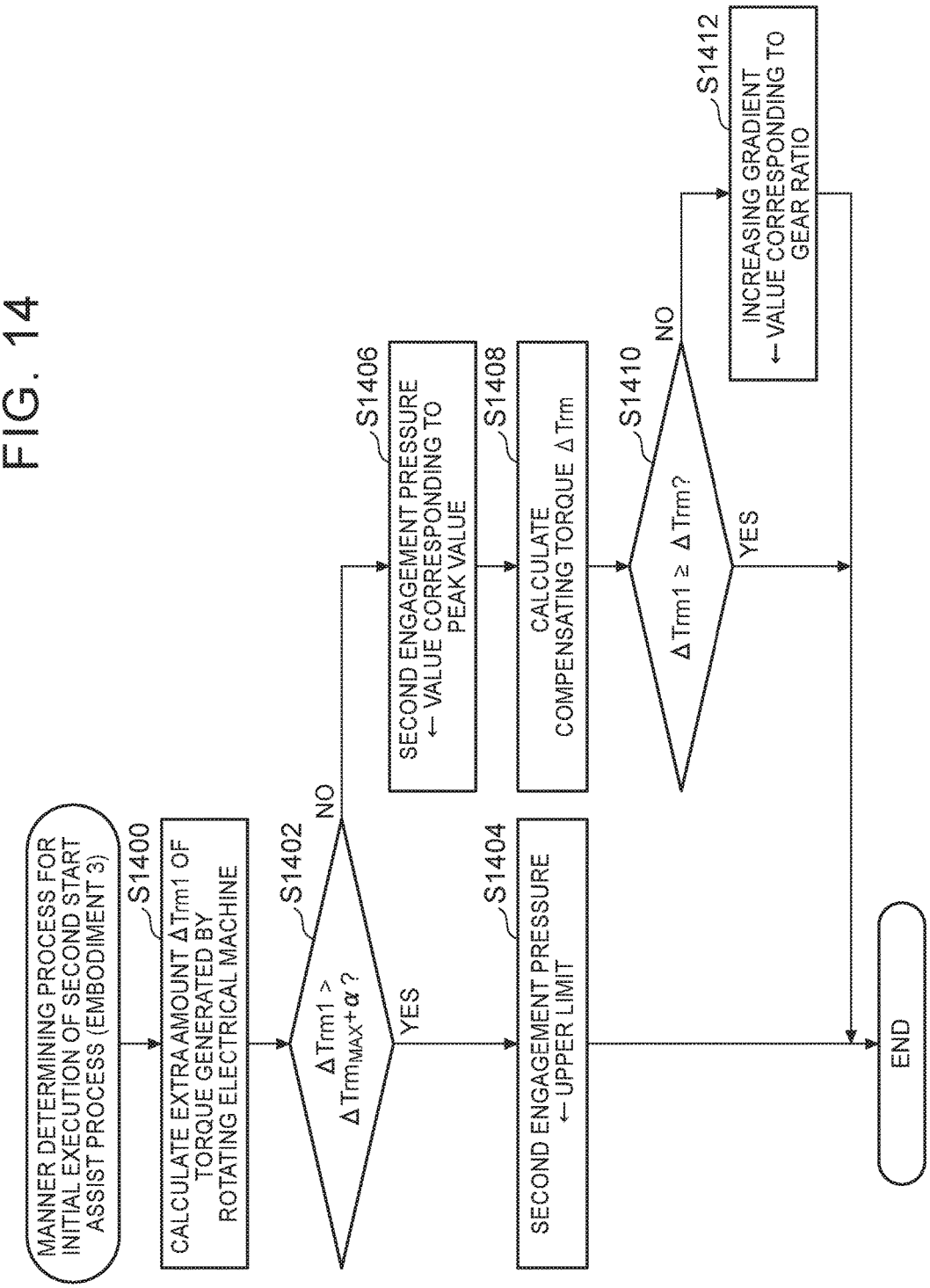

CONTROL DEVICE

TECHNICAL FIELD

The present disclosure relates to a control device that is adapted for vehicles in which a first engagement device and a rotating electrical machine are provided in a power transfer path connecting an internal combustion engine to wheels and that performs start assist control for the internal combustion engine.

BACKGROUND ART

In known internal combustion engine start control devices, when a request is made to start an internal combustion engine, a first engagement device is brought into a slip engagement state to start the internal combustion engine by using the power of a motor (for example, refer to Patent Document 1).

RELATED ART DOCUMENTS

Patent Documents

Patent Document 1: Japanese Patent Application Publication No. 2007-99141 (JP 2007-99141 A)

SUMMARY

It is noted that when the startability of an internal combustion engine is low, for example, under a cold environment, an attempt to start the internal combustion engine may fail. For example, since a cold environment increases the viscosity of an oil in an internal combustion engine, more torque is required to start the internal combustion engine. Therefore, when an attempt to start an internal combustion engine is made without consideration of such factor as cold environment, the attempt to start the internal combustion engine may fail due to lack of torque required to start the internal combustion engine.

In this regard, for a structure such as disclosed in Patent Document 1, increasing the transfer torque capacity of the first engagement device may increase the startability of the internal combustion engine. However, when the transfer torque capacity of the first engagement device is increased, output torque at wheels is reduced accordingly as a trade-off for the increase in the transfer torque capacity of the first engagement device. The amount of this reduction is compensable by an increase in torque generated by a motor. However, when the motor is unable to generate more torque due to the maximum torque generatable by the motor, the increase in torque generated by the motor may be insufficient to fully compensate the reduction in output torque at wheels, and consequently deceleration feel may be caused.

In view of the above, a purpose of the present disclosure is to provide a control device for performing start assist control for an internal combustion engine that makes it possible to reliably start the internal combustion engine while minimizing deceleration feel, even when the startability of the internal combustion engine is low.

Means for Solving the Problem

An aspect of the present disclosure provides a control device that is adapted for a vehicle drive system in which a first engagement device and a rotating electrical machine are provided in a power transfer path connecting an internal combustion engine to wheels, that performs start assist control for the internal combustion engine, and that includes: a first start assist processing unit that executes, when the first engagement device is in a disengaged state, a first start assist process that brings the first engagement device into slip engagement at a first engagement pressure while increasing a torque generated by the rotating electrical machine; and a second start assist processing unit that executes, when the first start assist process fails to start the internal combustion engine, a second start assist process that increases an engagement pressure of the first engagement device to a second engagement pressure higher than the first engagement pressure while increasing the torque generated by the rotating electrical machine, wherein the second start assist processing unit determines the second engagement pressure on the basis of a rotational speed of the internal combustion engine in the first start assist process.

The present disclosure provides a control device for performing start assist control for an internal combustion engine that makes it possible to reliably start the internal combustion engine while minimizing deceleration feel, even when the startability of the internal combustion engine is low.

BRIEF DESCRIPTION OF THE WINGS

FIG. 4 is a flowchart illustrating an example of a manner determining process for the initial execution of a second start assist process according to the embodiment 1.

FIG. 5 is a diagram illustrating an example of a map defining a relationship between a peak value of a rotational speed of an internal combustion engine and a second engagement pressure P2.

FIG. 14 is a flowchart illustrating an example of a manner determining process for the initial execution of a second start assist process according to an embodiment 3.

DETAILED DESCRIPTION

Below, embodiments of a control device for performing start assist control for an internal combustion engine are described in detail with reference to the accompanying drawings.

Figure 1:
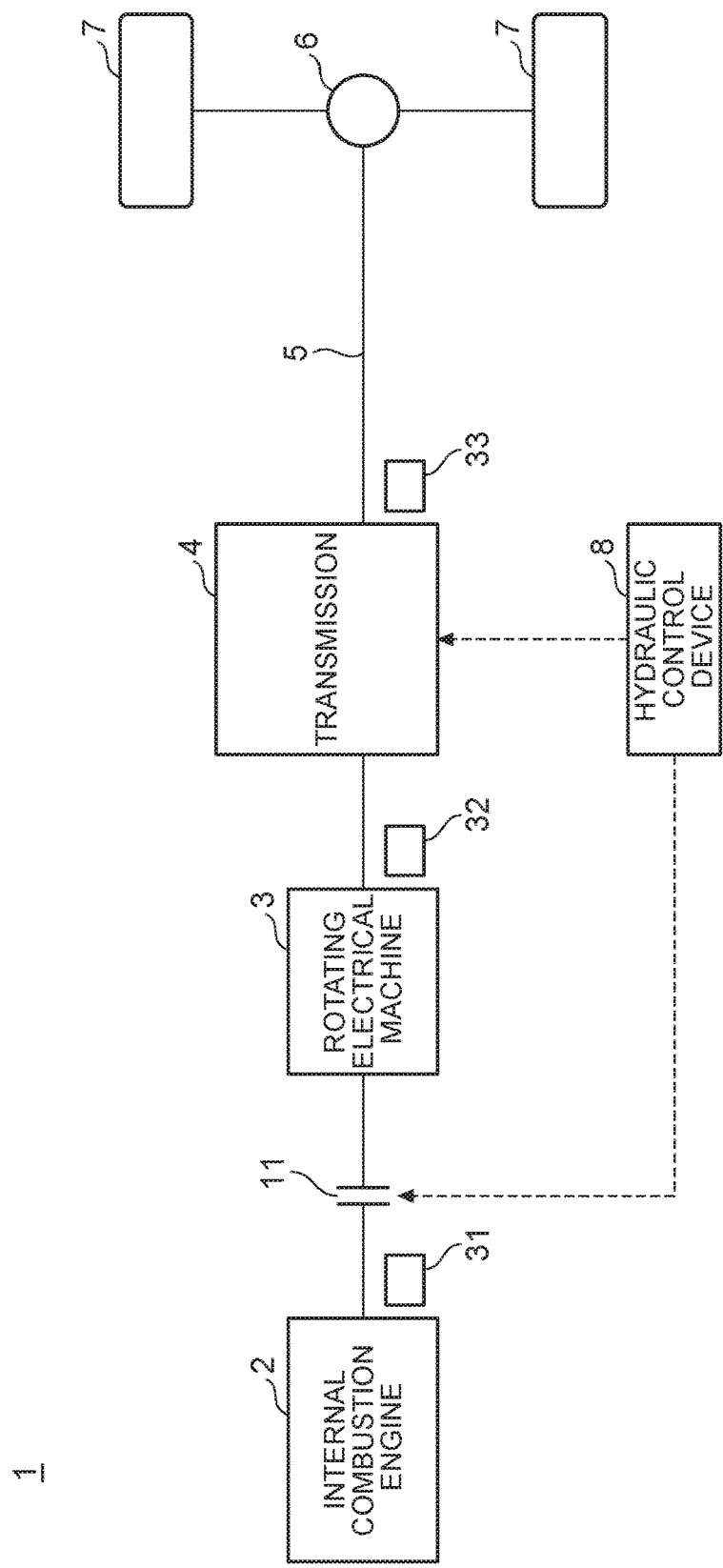
FIG. 1 is a structure diagram schematically illustrating an example of a vehicle drive system for which a control device is preferably adapted.

First, with reference to FIG. 1, a vehicle drive system for which the control device is adapted is described.

FIG. 1 is a structure diagram schematically illustrating an example of a vehicle drive system for which the control device is preferably adapted.

In a vehicle drive system 1, as illustrated in FIG. 1, a first engagement device 11, a rotating electrical machine 3, a transmission 4, and an output shaft 5 are provided in a power transfer path connecting an internal combustion engine 2 to wheels 7 and are arranged in this order from the internal combustion engine 2 side. A damper may be provided between the internal combustion engine 2 and the first engagement device 11. In the power transfer path, the vehicle drive system 1 may include additional elements other than those illustrated in FIG. 1. The example of FIG. 1 illustrates a rotational speed detecting sensor 31 for detecting the rotational speed of the internal combustion engine 2, a rotational speed detecting sensor 32 for detecting the rotational speed of the rotating electrical machine 3, and a rotational speed detecting sensor 33 for detecting the rotational speed of the output shaft 5.

The rotating electrical machine 3 is, for example, a motor generator having an electricity generating function.

The transmission 4 is, for example, an automatic transmission (AT). However, the transmission 4 may have any structure and may be, for example, a dual clutch transmission (DCT), a continuously variable transmission (CVT), or an automated manual transmission (AMT), etc.

The first engagement device 11 includes a friction engagement element. Controlling a hydraulic pressure applied to the first engagement device 11 controls an engagement pressure of the first engagement device 11, thus controlling a transfer torque capacity. For example, the first engagement device 11 may be a wet multi-plate clutch.

In the description below, for the first engagement device 11, "directly engaged state" refers to a directly engaged state from the point of view of control. However, the "directly engaged state" does not exclude a state where there is a slight rotational speed difference (slip) between engagement members of friction engagement elements. Further, "disengaged state" refers to a disengaged state from the point of view of control and does not exclude a state where there is a slight transfer torque capacity caused by drag between friction members.

The vehicle drive system 1 includes a hydraulic control device 8. The hydraulic control device 8 controls, in accordance with a command (hydraulic command) from a later-described control device, hydraulic pressures applied to the first engagement device 11 and the transmission 4. A part or whole of the functions of the hydraulic control device 8 may be implemented by a later-described control device 50.

Next, embodiments of a control device adapted for the vehicle drive system 1 are described.

Embodiment 1

Figure 2:
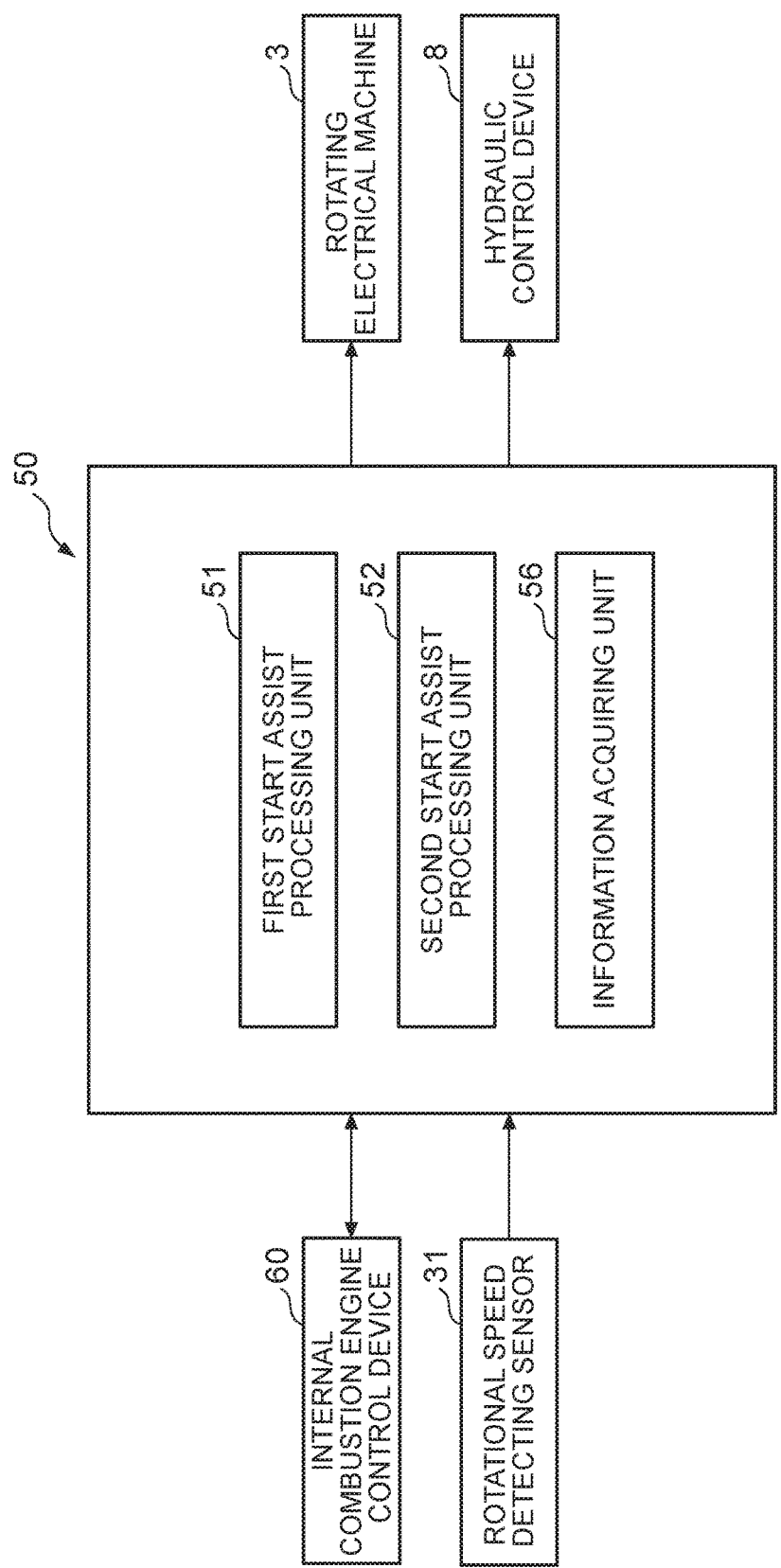
FIG. 2 is a diagram lustrating an example (embodiment 1) of a functional unit of a control device 50.

FIG. 2 is a diagram illustrating an example (embodiment 1) of a functional unit of the control device 50. The control device 50 is implemented by a computer. It is noted that an illustration of the hardware structure of the control device 50 is omitted. The functions of the control device 50 described below may be implemented by a hardware, a software, a firmware, or a combination of these. Further, the control device 50 may be implemented by multiple control devices that work in conjunction with each other.

The control device 50 is connected to the rotational speed detecting sensor 31, an internal combustion engine control device 60, the rotating electrical machine 3, and the hydraulic control device 8. This connection may be Made in any manner, including indirect connection via other control devices, direct connection, and wirelessly communicable connection.

In the example illustrated in FIG. 2, the control device 50 controls the rotating electrical machine 3 and the hydraulic control device 8 in conjunction with the internal combustion engine control device 60 that controls the internal combustion engine 2. For example, the internal combustion engine control device 60 determines a drive mode (e.g., an electric mode in which only the rotating electrical machine 3 is used as a power source to drive or a parallel mode in which at least the internal combustion engine 2 is used as a power source to drive) on the basis of a determined required drive force, the state of charge (SOC) of a battery etc. Further, the internal combustion engine control device 60 generates a control command for the rotating electrical machine 3 and a control command for the transmission 4 on the basis of the determined drive mode, the determined required drive force, etc. The control device 50 controls the rotating electrical machine 3 and the hydraulic control device 8 in accordance with the control commands. The control device 50 controls the first engagement device 11 and the transmission 4 via the hydraulic control device 8. The required drive force refers to a target value for a drive force that is applied to the wheels 7 through the output shaft 5. The required drive force is typically determined in accordance with accelerator pedal operation amount (accelerator opening degree) by a driver. However, for a vehicle with autonomous drive control, the required drive force may be determined on the basis of, for example, a set speed, a relationship with vehicles ahead, etc. A part or whole of the functions of the control device 50 may be implemented by the internal combustion engine control device 60, and apart, or whole of the functions of the internal combustion engine control device 60 may be implemented by the control device 50.

The control device 50 performs, in conjunction with the internal combustion engine control device 60, later-described start assist control to start the internal combustion engine 2 that is at a standstill. Specifically, when the control device 50 executes a later-described first start assist process or a later-described second start assist process, cranking of the internal combustion engine 2 begins, and the internal combustion engine control device 60 performs start control for the internal combustion engine 2 by using the cranking. The start control performed by the internal combustion engine control device 60 includes igniting fuel in a cylinder that is in compression stroke during the cranking.

The control device 50 includes a first start assist processing unit 51, a second start assist processing unit 52, and an information acquiring unit 56.

The first start assist processing unit 51 executes a first start assist process in synchronization with the start control performed by the internal combustion engine control device 60. The first start assist process includes bringing the first engagement device 11 into slip engagement at a first engagement pressure P1 while increasing torque generated by the rotating electrical machine 3, in order to start the internal combustion engine 2 that is at a standstill when the first engagement device 11 is in the disengaged state.

When the first start assist process fails to start the internal combustion engine 2 (i.e., when the start ends in failure), the second start assist processing unit 52 executes a second start assist process in synchronization with the start control performed by the internal combustion engine control device 60. The second start assist process includes increasing the engagement pressure of the first engagement device 11 to a second engagement pressure P2 higher than the first engagement pressure P1 while increasing the torque generated by the rotating electrical machine 3.

The second start assist processing unit 52 determines the second engagement pressure P2 on the basis of an increasing manner in which the rotational speed of the internal combustion engine 2 increases in association with the first start start assist process. The increasing manner in which the rotational speed of the internal combustion engine 2 increases can be determined on the basis of, for example, the amount of increase in the rotational speed, the rate of increase in the rotational speed (the amount of increase per time period), the peak value of the rotational speed, etc. For example, the second start assist processing unit 52 determines the second engagement pressure P2 in such a manner that the second engagement pressure P2 is greater than the first engagement pressure P1 and less than or equal to an upper limit $P2_{max}$ and that the second engagement pressure P2 becomes lower as the amount of increase in the rotational speed of the internal combustion engine 2 in association with the first start start assist process becomes larger. This is because when the amount of increase in the rotational speed of the internal combustion engine 2 in association with the first start start assist process is large, there is a high possibility that the second start assist process will start the internal combustion engine, for example, without setting the second engagement pressure P2 to such a high value as the upper limit. The upper limit $P2_{max}$ is not an upper limit of performance of the first engagement device 11. It is noted that the upper limit $P2_{max}$ is a value within a range where the first engagement device 11 is controlled to be in a slip engagement state, and for example, is an upper limit employable in the start assist control.

The information acquiring unit 56 acquires various information used in the start assist control.

It is noted that since a cold environment increases the viscosity of an oil in the internal combustion engine 2, more torque is required to start the internal combustion engine 2. Therefore, when the startability of the internal combustion engine is low under a cold environment, multiple executions of the first start assist process may still fail to start the internal combustion engine 2.

In this regard, according to the control device 50 illustrated in FIG. 2, when the first start assist process fails to start the internal combustion engine 2, the second start assist processing unit 52 executes the second start assist process at the second engagement pressure P2 higher than the first engagement pressure P1. This makes it possible to increase the startability of the internal combustion engine, compared to executing the start assist process at the same first engagement pressure P1 again after the first start assist process fails to start the internal combustion engine 2.

It is noted that although the startability of the internal combustion engine 2 increases with an increase in the second engagement pressure P2, the transfer torque capacity of the first engagement device 11 increases with the increase in the second engagement pressure P2, and accordingly, the amount of reduction in output torque at the wheels 7 due to the transfer torque capacity of the first engagement device 11 increases. The amount of reduction in output torque at the wheels 7 is compensable by an increase in torque generated by the rotating electrical machine 3. However, as the amount of reduction in output torque at the wheels 7 becomes larger, the likelihood of the amount of this reduction being uncompensated by the rotating electrical machine 3 becomes larger. When the rotating electrical machine 3 is unable to compensate the amount of this reduction, deceleration feel may be caused. Therefore, as the second engagement pressure P2 becomes larger, the startability of the internal combustion engine 2 increases, but the likelihood of deceleration feel being caused also increases.

In this regard, according to the control device 50 illustrated in FIG. 2, the second start assist processing unit 52 determines the second engagement pressure P2 on the basis of the increasing manner in which the rotational speed of the internal combustion engine 2 increases in association with the first start start assist process. This allows the second engagement pressure P2 to be optimized in accordance with the increasing manner in which the rotational speed of the internal combustion engine 2 increases in association with the first start start assist process, thus making it possible to reduce or prevent an increase in the transfer torque capacity of the first engagement device 11 that causes deceleration feel.

Next, an operation example of the control device 50 is described along with the functions of the first start assist processing unit 51 and the second start assist processing unit 52.

Figure 3:
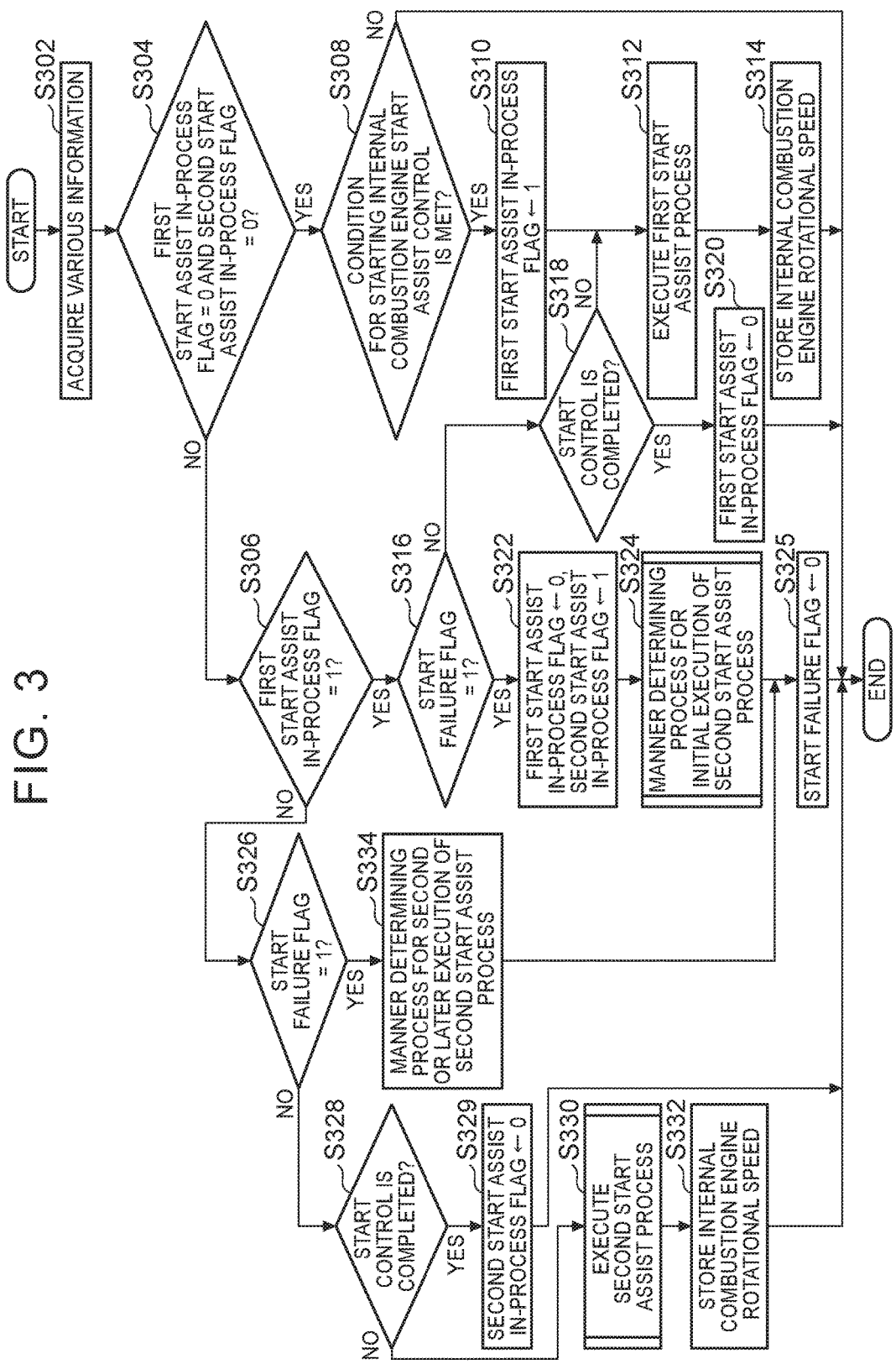
FIG. 3 is a flowchart illustrating an example (embodiment 1) of start assist control performed by the control device 50.

FIG. 3 is a flowchart illustrating an example (embodiment 1) of the start assist control performed by the control device 50. The procedure illustrated in FIG. 3 is, for example, repeatedly performed at predetermined cycles during a vehicle operation.

In step S302, the information acquiring unit 56 acquires the latest information used in the start assist control illustrated in FIG. 3. The information includes, for example, rotational speed information from the rotational speed detecting sensor 31 and information from the internal combustion engine control device 60 (e.g., a command value for a torque generated by the rotating electrical machine 3).

In step S304, the first start assist processing unit 51 determines whether or not a first start assist in-process flag=0 and a second start assist in-process flag=0. The first start assist in-process flag of "1." means that the first start assist process is being executed, and the first start assist in-process flag of "0" means that the first start assist process is not being executed. The second start assist in-process flag of "1" means that the second start assist process is being executed, and the second start assist in-process flag of "0" means that the second start assist process is not being executed. If the determination result is "YES", the start assist control proceeds to step S308; whereas if the determination result is "NO", the start assist control proceeds to step S306.

In step S306, the first start assist processing unit 51 determines whether or not the first start assist in-process flag=1. If the determination result is "YES", the start assist control proceeds to step S316; whereas if the determination result is "NO" (i.e., if the first start assist in-process flag=0, and the second start assist in-process flag=1), the start assist control proceeds to step S326.

In step S308, the first start assist processing unit 51 determines whether or not a condition for starting internal combustion engine start assist control is met. The condition for starting the internal combustion engine start assist control may be met, for example, when all the following conditions (1) to (3) are met. However, additional conditions may be imposed.

(1) An internal combustion engine start assist control request is issued from the internal combustion engine control device 60.
(2) The first engagement device 11 is in the disengaged state.
(3) The rotating electrical machine 3 is being rotated (or a vehicle body speed is greater than zero).

If the determination result is "YES", the start assist control proceeds to step S310; whereas if the determination result is "NO", the start assist control ends.

In step S310, the first start assist processing unit 51 sets the first start assist in-process flag to "1".

In step S312, the first start assist processing unit 51 executes the first start assist process. As already described, the first start assist process includes bringing the first engagement device 11 into slip engagement at the first engagement pressure P1 while increasing the torque generated by the rotating electrical machine 3. For example, the first start assist processing unit 51 controls the rotating electrical machine 3 on the basis of a target torque that is the sum of the command value for a generated torque commanded by the internal combustion engine control device 60 and a compensating torque for compensating the present transfer torque capacity of the first engagement device 11, so that the target torque can be achieved.

In step S314, the first start assist processing unit 51 stores the present internal combustion engine rotational speed on the basis of information from the rotational speed detecting sensor 31.

In step S316, the first start assist processing unit 51 determines whether or not the first start assist process fails to start the internal combustion engine 2 (i.e., determines whether or not the internal combustion engine control device 60 in conjunction with the first start assist process fails to start the internal combustion engine 2). In this example, the first start assist processing unit 51 determines whether or not a start failure flag=1. The start failure flag is set to "1" by the internal combustion engine control device 60 when the start control fails to start the internal combustion engine 2. The start failure flag of "1" means that the start control by the internal combustion engine control device 60 ends in failure; whereas the start failure flag of "0" means that the start control by the internal combustion engine control device 60 does not end in failure (including an indefinite state). The first start assist processing unit 51 may determine whether or not the first start assist process fails to start the internal combustion engine 2, on the basis of other information. For example, the first start assist processing unit 51 can determine whether or not the internal combustion engine 2 fails to start, on the basis of the rotational speed information from the rotational speed detecting sensor 31. For example, when the rotational speed of the internal combustion engine 2 drops to zero after increasing synchronously with the first start assist process, the first start assist processing unit 51 may determine that the first start assist process fails to start the internal combustion engine 2. If the determination result is "YES", the start assist control proceeds to step S322; whereas if the determination result is "NO", the start assist control proceeds to step S318.

In step S318, the first start assist processing unit 51 determines whether or not the internal combustion engine control device 60 in conjunction with the first start assist process completes the start control for the internal combustion engine 2. Whether or not the internal combustion engine control device 60 completes the start control for the internal combustion engine 2 can be determined, for example, on the basis of information (e.g., a start completion flag) acquirable from the internal combustion engine control device 60. Alternatively, whether or not the internal combustion engine control device 60 completes the start control for the internal combustion engine 2 can be determined on the basis of the rotational speed information from the rotational speed detecting sensor 31. For example, when the rotational speed of the internal combustion engine 2 is increasing and exceeds an idle rotational speed (a rotational speed that allows self-sustaining operation), the first start assist processing unit 51 may determine that the internal combustion engine control device 60 completes the start control for the internal combustion engine 2. If the determination result is "YES", the start assist control proceeds to step S320; whereas if the determination result is "NO", the start assist control proceeds to step S312.

In step S320, the first start assist processing unit 51 resets the first start assist in-process flag to "0". As a result, the first start assist process ends. Accordingly, the first engagement device 11 is brought into the directly engaged state.

In step S322, the first start assist processing unit 51 resets the first start assist in-process flag to "0" and sets the second start assist in-process flag to "1". As a result, the first start assist process ends, and the second start assist process starts.

In step S324, the second start assist processing unit 52 executes a process of determining an execution manner for the first execution of the second start assist process (hereinafter, sometimes referred to as a "manner determining process for the initial execution of the second start assist process"). A specific example of the manner determining process for the initial execution of the second start assist process is described later with reference to the diagrams including FIG. 4 and FIG. 5.

In step S325, the second start assist processing unit 52 resets the start failure flag to "0".

In step S326, the second start assist processing unit 52 determines whether or not the present execution of the second start assist process fails to start the internal combustion engine 2 (i.e., determines whether or not the internal combustion engine control device 60 in conjunction with the present execution of the second start assist process fails to start the internal combustion engine 2). This determination is made in the same way as that described above for step S316. If the determination result is "YES", the start assist control proceeds to step S334; whereas if the determination result is "NO", the start assist control proceeds to step S328.

In step S328, the second start assist processing unit 52 determines whether or not the internal combustion engine control device 60 in conjunction with the present execution of the second start assist process completes the start control for the internal combustion engine 2. The determination of whether or not the internal combustion engine control device 60 completes the start control for the internal combustion engine 2 is made in the same way as that described above for step S318. If the determination result is "YES", the start assist control proceeds to step S329; whereas if the determination result is "NO", the start assist control proceeds to step S330.

In step S329, the second start assist processing unit 52 resets the second start assist in-process flag to "0". As a result, the second start assist process ends. Accordingly, the first engagement device 11 is brought into the directly engaged state.

In step S330, the second start assist processing unit 52 executes the second start assist process in accordance with a manner for the second start assist process that has been determined by the manner determining process for the initial execution of the second start assist process (step S324) or that has been determined by the manner determining process for the second or later execution of the second start assist process (step S334). It is noted that the second start assist process can be started at any timing. For example, the second start assist processing unit 52 may start the second start assist process when the internal combustion engine start assist control request is reissued from the internal combustion engine control device 60 (when the internal combustion engine start assist control request is issued after the start failure flag is reset to "0"). A specific example of the second start assist process is described later with reference to the drawings including FIG. 6.

In step S332, the second start assist processing unit 52 stores the present internal combustion engine rotational speed on the basis of information from the rotational speed detecting sensor 31.

In step S334, the second start assist processing unit 52 executes a process of determining an execution manner for the next (the second or later) execution of the second start assist process (hereinafter, sometimes referred to as a "manner determining process for the second or later execution of the second start assist process"). Like the manner determining process for the initial execution of the second start assist process, the manner determining process for the second or later execution of the second start assist process includes determining the second engagement pressure P2. However, the manner determining process for the second or later execution of the second start assist process determines a manner for the second start assist process that achieves startability better than the startability achieved by the manner determining process for the initial execution of the second start assist process. For example, the manner determining process for the second or later execution of the second start assist process sets the second engagement pressure P2 to the upper limit $P2_{max}$ and sets an increasing gradient G2 to a fixed value.

According to the procedure illustrated in FIG. 3, when the first start assist process fails to start the internal combustion engine 2, the second start assist process is executed in the manner for the second start assist process determined by the manner determining process for the initial execution of the second start assist process. Further, when the second start assist process executed in the manner for the second start assist process determined by the manner determining process for the initial execution of the second start assist process fails to start the internal combustion engine 2, the second start assist process is executed in the manner for the second start assist process determined by the manner determining process for the second or later execution of the second start assist process.

FIG. 4 is a flowchart illustrating an example of the manner determining process for the initial execution of the second start assist process according to the embodiment 1. The process illustrated in FIG. 4 is executed as a procedure in step S324 illustrated in FIG. 3.

In step S400, the second start assist processing unit 52 reads stored data (refer to step S314) about the internal combustion engine rotational speed that has appeared during execution of the first start assist process.

In step S402, the second start assist processing unit 52 identifies, on the basis of the read stored data, a peak value Np (the maximum value) of the rotational speed of the internal combustion engine 2 in association with the first start assist process.

In step S404, the second start assist processing unit 52 determines the second engagement pressure P2 corresponding to the peak value Np identified in step S402. For example, a map defining a relationship between the peak value Np and the second engagement pressure P2, such as illustrated in FIG. 5, is prepared and stored in a storage device (not illustrated in the drawings). In the example illustrated in FIG. 5, when the peak value Np is in the range from zero to N1, the second engagement pressure P2 is determined to be the upper limit $P2_{max}$. When the peak value Np is in the range from N1 to N2, the second engagement pressure P2 decreases in proportion to the peak value Np. When the peak value Np is larger than or equal to N2, the second engagement pressure P2 is determined to be a minimum value $P2_0$. The example illustrated in FIG. 5 is just one example, and various modifications are possible. For example, the relationship between the second engagement pressure P2 and the peak value Np in the range from N1 to N2 may be nonlinear, and N1 may be zero.

According to the process illustrated in FIG. 4, the second engagement pressure P2 is determined, on the basis of the peak value Np of the rotational speed of the internal combustion engine 2 in association with the first start assist process, in such a manner that the second engagement pressure P2 becomes smaller as the peak value Np becomes larger.

Although the process illustrated in FIG. 4 determines, on the basis of the relationship between the peak value Np and the second engagement pressure P2, the second engagement pressure P2 corresponding to the peak value Np, other manners may be used. For example, the second start assist processing unit 52 may calculate, on the basis of the peak value Np of the rotational speed of the internal combustion engine 2 in association with the first start assist process, a deviation between the peak value Np and a reference value and may determine the second engagement pressure P2 corresponding to the calculated deviation. The reference value may correspond to a rotational speed that allows self-sustaining operation. The reference value is calibrated on the basis of, for example, tests and stored in a storage device (not illustrated in the drawings). In this case, the second start assist processing unit 52 determines the second engagement pressure P2 in such a manner that the second engagement pressure P2 becomes smaller as the deviation becomes smaller. Even in this manner, it is still true that the second start assist processing unit 52 determines the second engagement pressure P2 in such a manner that the second engagement pressure P2 becomes lower as the peak value Np of the rotational speed of the internal combustion engine 2 that has increased in the first start assist process becomes larger. Alternatively, the second start assist processing unit 52 may determine, on the basis of the rate of increase in the rotational speed (the amount of increase per time period) of the internal combustion engine 2 in association with the first start assist process, the second engagement pressure P2 in such a manner that the second engagement pressure P2 becomes smaller as the rate of increase in the rotational speed becomes larger. This is because there is a tendency that the peak value Np of the rotational speed of the internal combustion engine 2 in association with the first start assist process becomes larger as the rate of increase in the rotational speed of the internal combustion engine 2 in association with the first start assist process becomes larger. It is noted that the rate of increase in the rotational speed of the internal combustion engine 2 can be acquired by twice differentiating, with respect to time, time series of detected crank angles acquired from a crank angel sensor.

Figure 6:
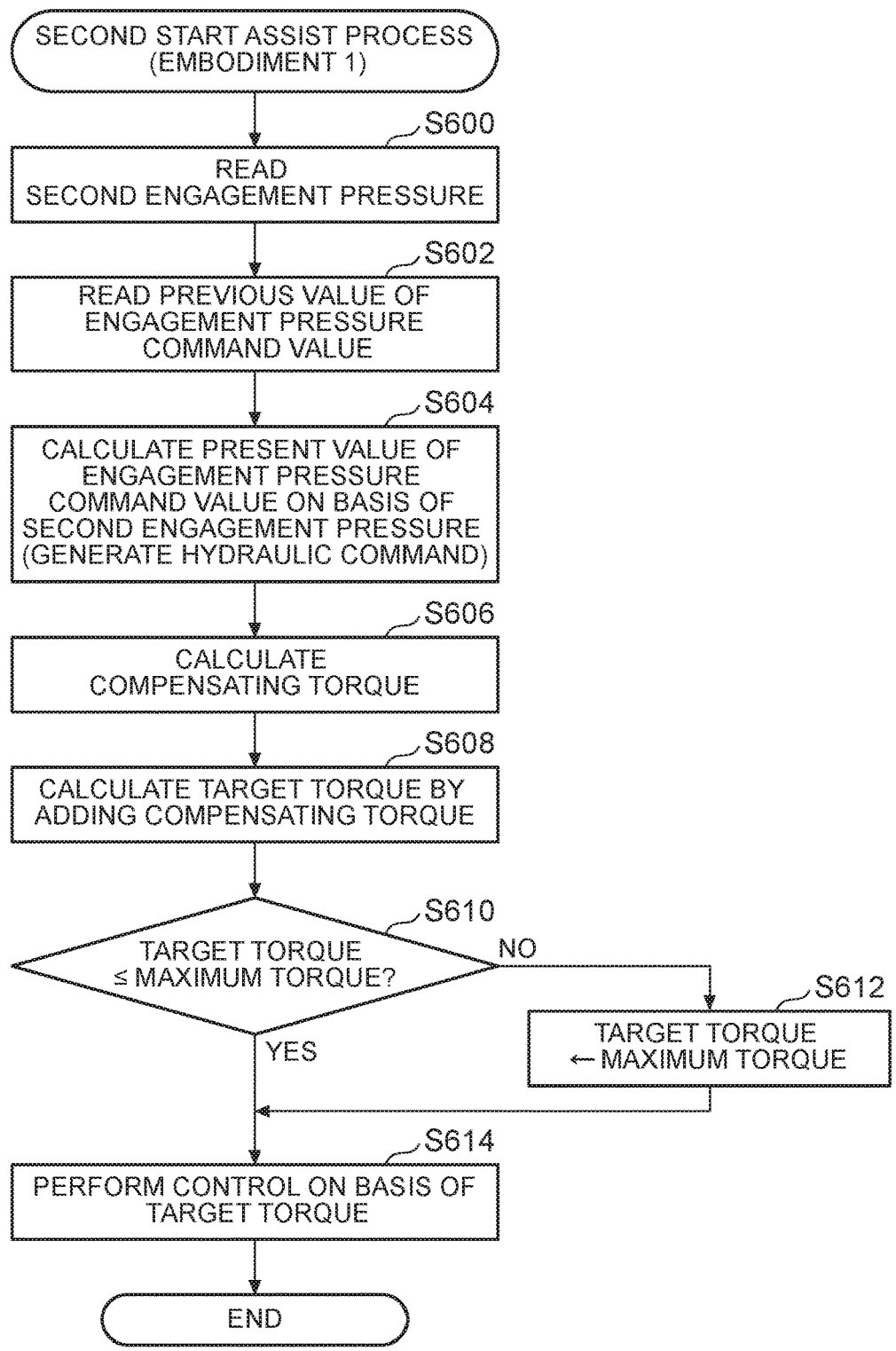
FIG. 6 is a flowchart illustrating an example of the second start assist process according to the embodiment 1.

FIG. 6 is a flowchart illustrating an example of the second start assist process according to the embodiment 1. The process illustrated in FIG. 6 is executed as a procedure in step S330 illustrated in FIG. 3.

In step S600, the second start assist processing unit 52 reads the second engagement pressure P2 that has been determined by the manner determining process for the initial execution of the second start assist process (step S324) or that has been determined by the manner determining process for the second or later execution of the second start assist process (step S334).

In step S602, the second start assist processing unit 52 reads a previous value P2(i−1) of the command value for the engagement pressure of the first engagement device 11. It is noted that in an initial processing cycle, the previous value P2(i−1) of the command value for the engagement pressure is the present value of the engagement pressure of the first engagement device 11.

In step S604, the second start assist processing unit 52 calculates a present value P2(i) of the command value for the engagement pressure of the first engagement device 11. The present value P2(i) is calculated, for example, as follows:

$$P2(i)=P2(i-1)+G2\times \Delta T,$$

where G2 refers to an increasing gradient and is a fixed value. ΔT corresponds to a processing cycle. If P2(i) is greater than or equal to the second engagement pressure P2, P2(i) is set to the second engagement pressure P2. The second start assist processing unit 52 provides the hydraulic control device 8 with a hydraulic command having a command value of the calculated present value P2(i).

In step S606, the second start assist processing unit 52 calculates, on the basis of the present value P2(i) of the command value for the engagement pressure of the first engagement device 11, a torque that the rotating electrical machine 3 needs to compensate for (hereinafter, referred to as the "compensating torque"). Specifically, the second start assist processing unit 52 calculates a compensating torque for compensating the transfer torque capacity of the first engagement device 11 corresponding to the present value P2(i).

Figure 7:
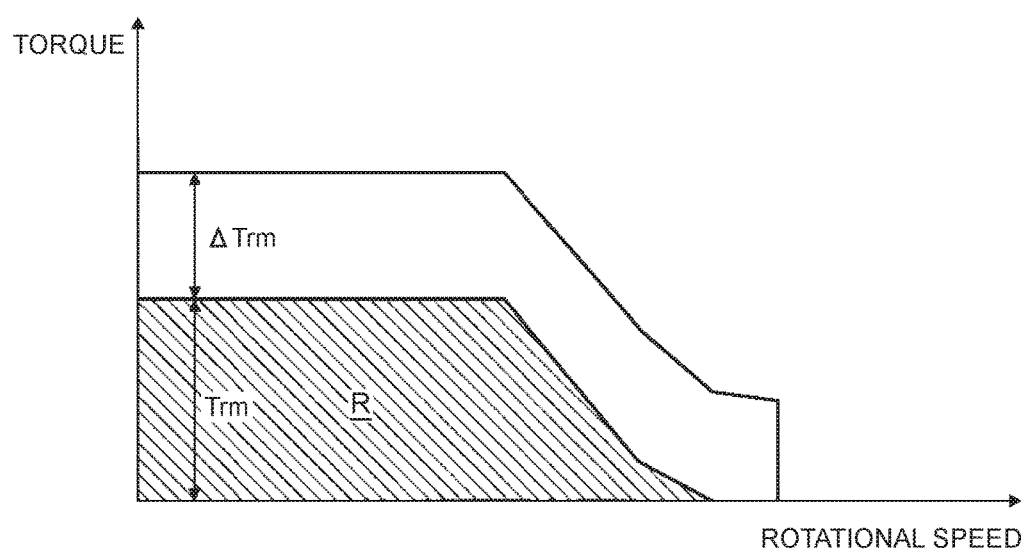
FIG. 7 is a diagram illustrating an example of a relationship between a command value Tr for a generated torque and a compensating torque ΔTr.

In step S608, the second start assist processing unit 52 calculates a target torque by adding the compensating torque calculated in step S606 to the command value for a generated torque commanded by the internal combustion engine control device 60. Specifically, as illustrated in FIG. 7, the target torque is calculated by adding a compensating torque ΔTrm to a command value Tim for a generated torque commanded by the internal combustion engine control device 60. In the example illustrated in FIG. 7, a hatched region R corresponds to a region for an electric mode in which only the rotating electrical machine 3 is used as a power source to drive.

In step S610, the second start assist processing unit 52 determines whether or not the target torque calculated in step S608 is less than or equal to the maximum torque outputtable by the rotating electrical machine 3. If the determination result is "YES", the second start assist process proceeds to step S614; whereas if the determination result is "NO", the second start assist process proceeds to step S612.

In step S612, the second start assist processing unit 52 corrects the target torque calculated in step S608 to the maximum torque outputtable by the rotating electrical machine 3.

In step S614, the second start assist processing unit 52 controls the rotating electrical machine 3 so that the target torque can be achieved.

The process illustrated in FIG. 6 makes it possible to increase the engagement pressure of the first engagement device 11 toward the second engagement pressure P2 in accordance with the second engagement pressure P2 that has been determined by the manner determining process for the initial execution of the second start assist process or that has been determined by the manner determining process for the second or later execution of the second start assist process. Further, it makes it possible to control the torque generated by the rotating electrical machine 3 so that the transfer torque capacity of the first engagement device 11 corresponding to the engagement pressure of the first engagement device 11 can be compensated.

Figure 8:
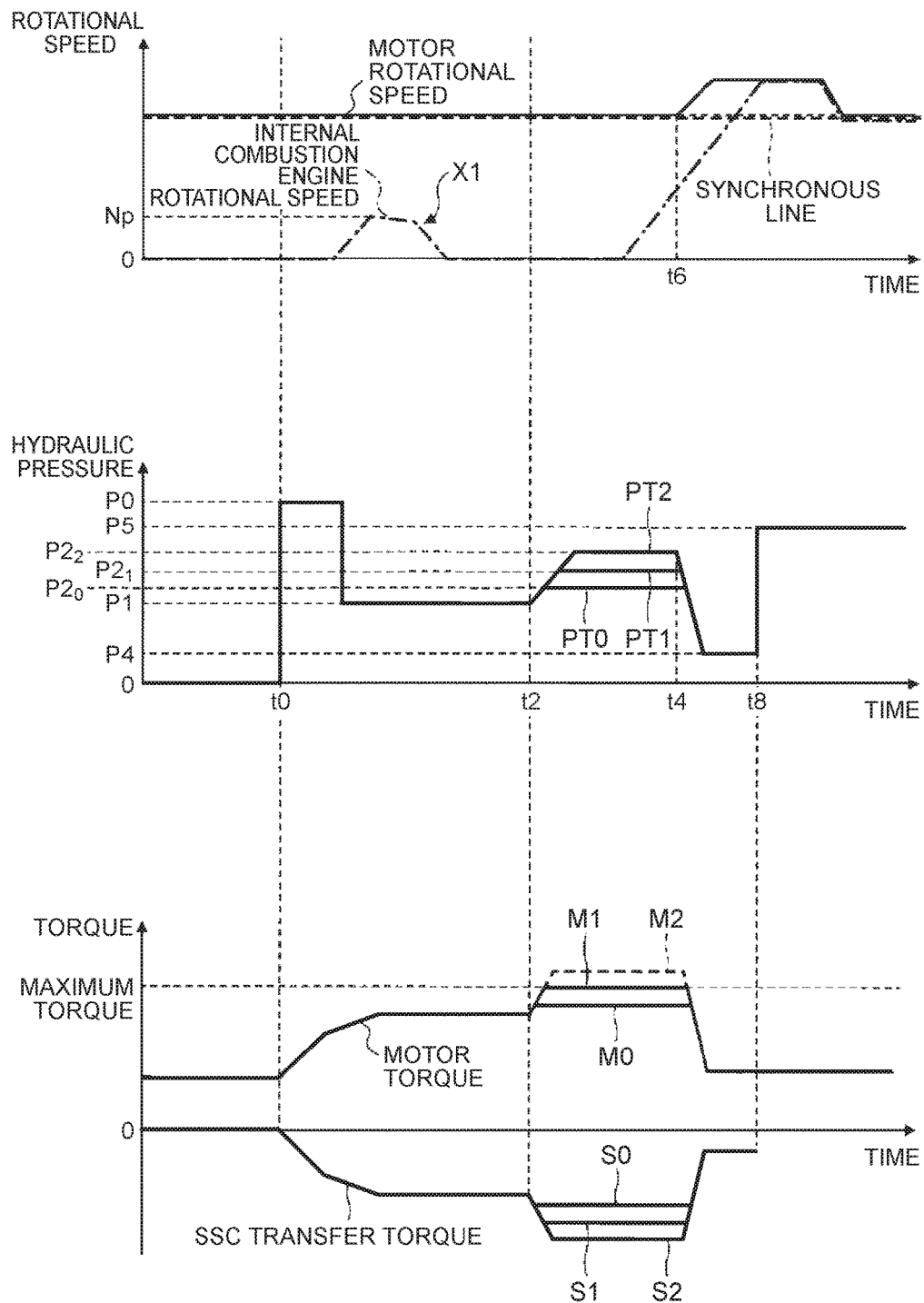
FIG. 8 is a timing chart of a first start assist process and the second start assist process according to the embodiment 1.

FIG. 8 is an explanatory diagram of the procedure illustrated in FIG. 3 and is a timing chart of the first start assist process and the second start assist process according to the embodiment 1. From the top, FIG. 8 illustrates a time series of a rotational speed, a time series of a hydraulic pressure, and a time series of a torque. As the time series of a rotational speed, the rotational speed of the internal combustion engine 2 (internal combustion engine rotational speed), the rotational speed of the rotating electrical machine 3 (motor rotational speed), and a synchronous line are illustrated. The synchronous line corresponds to a rotational speed that is obtained by multiplying the rotational speed of the output shaft 5 by a gear ratio (speed ratio) presently achieved by the transmission 4. As the time series of a hydraulic pressure, a time series of the hydraulic command (engagement pressure) for the first engagement device 11 is illustrated in three patterns from PT0 to PT2. The patterns from PT0 to PT2 differ in the second engagement pressure P2 from each other. The pattern PT0 represents a case where the second engagement pressure P2 is determined to be $P2_0$, the pattern PT1 represents a case where the second engagement pressure P2 is determined to be $P2_1$, and the pattern PT2 represents a case where the second engagement pressure P2 is determined to be $P2_2$, where $P2_0 < P2_1 < P2_2$. As the time series of a torque, a time series of the torque generated by the rotating electrical machine 3 (motor torque) and a time series of the transfer torque capacity of the first engagement device 11 (SSC transfer torque) are each illustrated in three patterns. Each pattern corresponds to a difference (three patterns) in the second engagement pressure P2. For a pattern M2, a dotted line section represents a pattern before a correction to the maximum torque (step S612) is made. It is noted that for the transfer torque capacity of the first engagement device 11, a negative section until a time t8 (a section used to start the internal combustion engine 2) is illustrated.

An electric mode continues until a time t0. Thus, until the time t0, the first engagement device 11 is in the disengaged state, the transmission 4 achieves a gear speed for forward movement, and the command value for a generated torque commanded by the internal combustion engine control device 60 is a fixed value.

At the time t0, the condition for starting the internal combustion engine start assist control is met ("YES" in step S308), and accordingly, the first start assist process is started. In the example illustrated in FIG. 8, the first start assist process increases the hydraulic command (engagement pressure) for the first engagement device 11 to the first engagement pressure P1 and causes the rotating electrical machine 3 to generate a compensating torque for compensating the transfer torque capacity of the first engagement device 11. It is noted that a value P0 is a hydraulic command for increasing responsivity. In the example illustrated in FIG. 8, as indicated by X1, the internal combustion engine rotational speed increases, but is still insufficient for starting (rotational speed that allows self-sustaining operation), so that the start of the internal combustion engine 2 ends in failure ("YES" in step S316).

As a result, at a time t2, the second start assist process is started (step S330) Here, as one example, the second engagement pressure P2 is determined to be P2$_1$ (step S324), and the hydraulic command (engagement pressure) for the first engagement device 11 is increased so that the second engagement pressure P2 can become equal to P2$_1$. Accordingly, the transfer torque capacity of the first engagement device 11 increases (refer to a pattern S1), and the torque generated by the rotating electrical machine 3 is increased to compensate the amount of increase in the transfer torque capacity of the first engagement device 11 (refer to a pattern M1).

At a time t4, the second start assist process succeeds in starting the internal combustion engine 2, and accordingly, the hydraulic command for the first engagement device 11 is temporarily reduced to a value P4. Accordingly, the transfer torque capacity of the first engagement device 11 is reduced, and the torque generated by the rotating electrical machine 3 is reduced in accordance with the amount of reduction in the transfer torque capacity of the first engagement device 11. After that, at a time t6, an engagement device (not illustrated in the drawings) inside the transmission 4 is brought into the slip engagement state. Then, at the time t8, the rotational speed of the internal combustion engine 2 synchronizes with the rotational speed of the rotating electrical machine 3, and the hydraulic command for the first engagement device 11 is increased to a value P5, so that the first engagement device 11 is brought into the directly engaged state.

As already described, although the startability of the internal combustion engine 2 increases with an increase in the second engagement pressure P2, the transfer torque capacity of the first engagement device 11 increases with the increase in the second engagement pressure P2, and accordingly the likelihood of deceleration feel being caused increases. For example, in the example illustrated in FIG. 8, when the second engagement pressure P2 is equal to P2$_2$, the pattern M2 represents a torque that the rotating electrical machine 3 needs to generate to fully compensate the transfer torque capacity of the first engagement device 11. However, since the pattern M2 exceeds the maximum torque generatable by the rotating electrical machine 3, an amount exceeding the maximum torque is an uncompensable torque. As the uncompensable torque becomes larger, the likelihood of deceleration feel being caused becomes larger.

In this regard, according to the procedure illustrated in FIG. 3, the second start assist processing unit 52 determines, on the basis of the peak value Np of the rotational speed of the internal combustion engine 2 in association with the first start start assist process, the second engagement pressure P2, in such a manner that the second engagement pressure P2 becomes lower as the peak value Np becomes larger. This allows the second engagement pressure P2 to be set to a low value (e.g., the second engagement pressure P2 may be set to P2$_0$ or the second engagement pressure P2 may be set to P2$_1$), thereby making it possible to reduce or prevent deceleration feel. Thus, the procedure illustrated in FIG. 3 increases the startability of the internal combustion engine 2 while reducing or preventing deceleration feel that is caused by an increase in the transfer torque capacity of the first engagement device 11.

Embodiment 2

Next, an embodiment 2 is described with reference to the drawings after FIG. 9. The embodiment 2 differs from the embodiment 1 in that an increasing gradient G2 changes in accordance with a gear ratio.

Although not illustrated in the drawings (refer to FIG. 2), a control device 50B according to the embodiment 2 includes the first start assist processing unit 51, a second start assist processing unit 52B, and the information acquiring unit 56.

Figure 9:
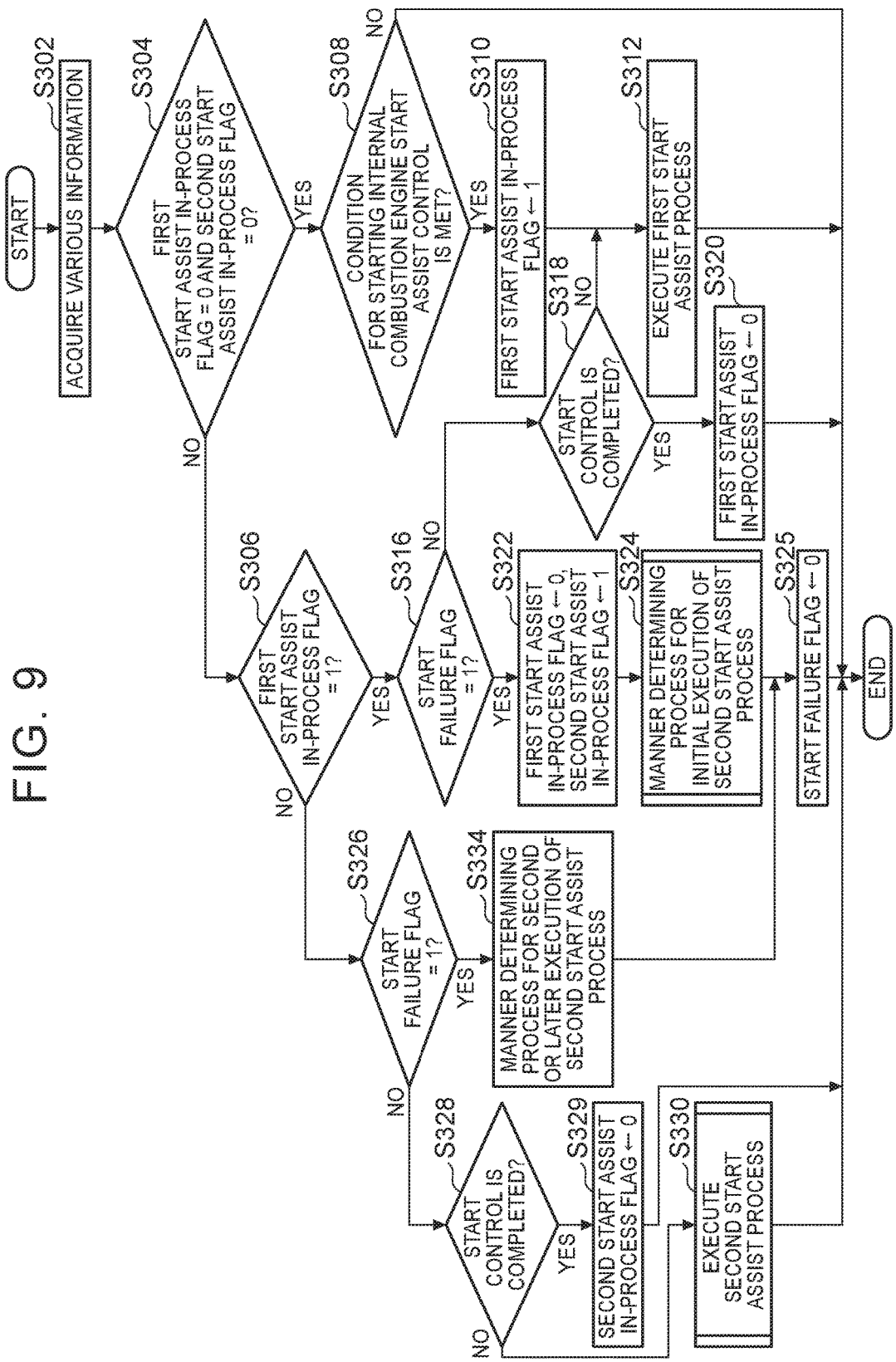
FIG. 9 is a flowchart illustrating an example (embodiment 2) of start assist control performed by the control device 50.

FIG. 9 is a flowchart illustrating an example (embodiment 2) of start assist control performed by the control device 50B. The procedure illustrated in FIG. 9 is, for example, repeatedly executed at predetermined cycles during a vehicle operation.

The procedure illustrated in FIG. 9 differs from the procedure illustrated in FIG. 3 in that both step S314 and step S332 are eliminated.

Figure 10:
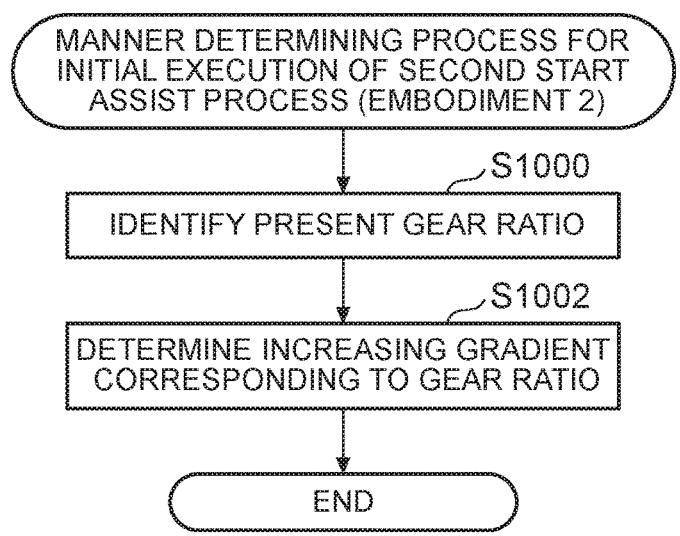
FIG. 10 is a flowchart illustrating an example of a manner determining process for the initial execution of a second start assist process according to the embodiment 2.

FIG. 10 is a flowchart illustrating an example of a manner determining process for the initial execution of the second start assist process according to the embodiment 2. The process illustrated in FIG. 10 is executed as a procedure in step S324 illustrated in FIG. 9.

In step S1000, the second start assist processing unit 52B identifies a presently achieved gear speed (the present gear ratio of the transmission 4). The present gear ratio of the transmission 4 can be obtained on the basis of control information of the control device 50B itself. Alternatively, the present gear ratio of the transmission 4 may be identified on the basis of information from a shift position sensor (not illustrated in the drawings).

Figure 11:
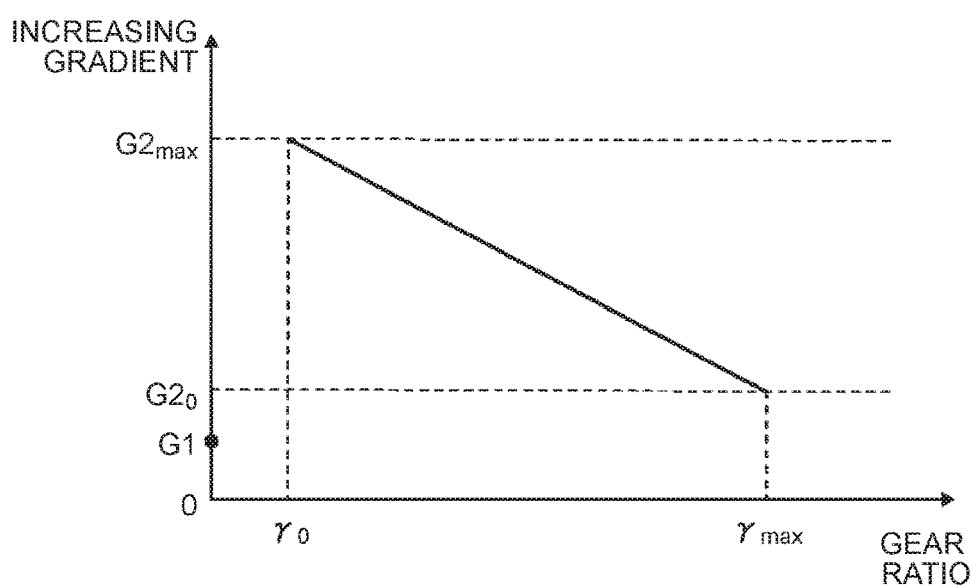
FIG. 11 is a diagram illustrating an example of a map defining a relationship between a gear ratio and an increasing gradient G2.

In step S1002, the second start assist processing unit 52B determines the increasing gradient G2 corresponding to the present gear ratio of the transmission 4. For example, a map defining a relationship between the present gear ratio and the increasing gradient G2, such as illustrated in FIG. 11, is prepared and stored in a storage device (not illustrated in the drawings). In the example illustrated in FIG. 11, the gear ratio achievable by the transmission 4 has a range from $\lambda_0$ to $\lambda_{max}$, and the increasing gradient G2 decreases in proportion to the gear ratio. The example illustrated in FIG. 11 is just one example, and various modifications are possible. For example, the increasing gradient G2 may increase non-linearly with an increase in the gear ratio.

According to the process illustrated in FIG. 10, the increasing gradient G2 is determined, on the basis of the present gear ratio of the transmission 4, in such a manner that the increasing gradient G2 becomes smaller as the gear ratio becomes larger.

Figure 12:
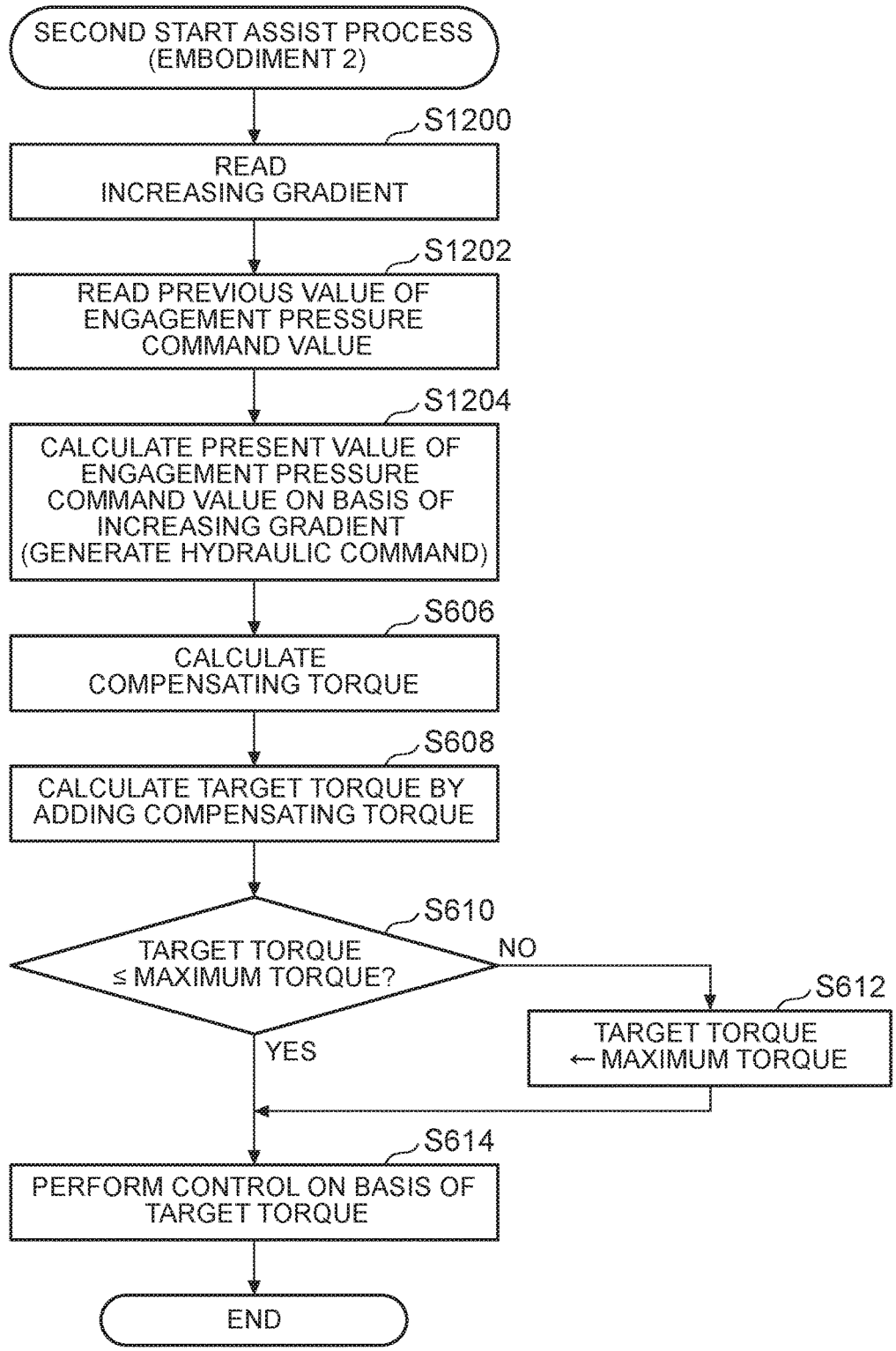
FIG. 12 is a flowchart illustrating an example of the second start assist process according to the embodiment 2.

FIG. 12 is a flowchart illustrating an example of the second start assist process according to the embodiment 2. The process illustrated in FIG. 12 is executed as a procedure in step S330 illustrated in FIG. 9.

The process illustrated in FIG. 12 differs from the process illustrated in FIG. 6 in that steps S600 to S604 are replaced with steps S1200 to S1204. The following description is focused on the difference from the process illustrated in FIG. 6.

In step S1200, the second start assist processing unit 52B reads an increasing gradient G2 that has been determined by the manner determining process for the initial execution of the second start assist process (step S324) or that has been determined by the manner determining process for the second or later execution of the second start assist process (step S334). Further, the second start assist processing unit 52B reads the second engagement pressure P2. The second engagement pressure P2 is a predetermined fixed value (>the first engagement pressure P1).

In step S1202, the second start assist processing unit 52B reads a previous value P2(i−1) of the command value for the engagement pressure of the first engagement device 11.

In step S1204, the second start assist processing unit 52B calculates a present value P2(i) of the command value for the engagement pressure of the first engagement device 11. The present value P2(i) is calculated, for example, as follows:

$$P2(i)=P2(i-1)+G2\times\Delta T,$$

where G2 refers to an increasing gradient and is set to the value read in step S1200. ΔT corresponds to a processing cycle. If P2(i) is greater than or equal to the second engagement pressure P2, P2(i) is set to the second engagement pressure P2. The second start assist processing unit 52B provides the hydraulic control device 8 with a hydraulic command having a command value of the calculated present value P2(i).

The process illustrated in FIG. 12 makes it possible to increase the engagement pressure of the first engagement device 11 toward the second engagement pressure P2 in accordance with the increasing gradient G2 that has been determined by the manner determining process for the initial execution of the second start assist process or that has been determined by the manner determining process for the second or later execution of the second start assist process. Further, it makes it possible to control the torque generated by the rotating electrical machine 3 so that the transfer torque capacity of the first engagement device 11 corresponding to the engagement pressure of the first engagement device 11 can be compensated.

Figure 13:
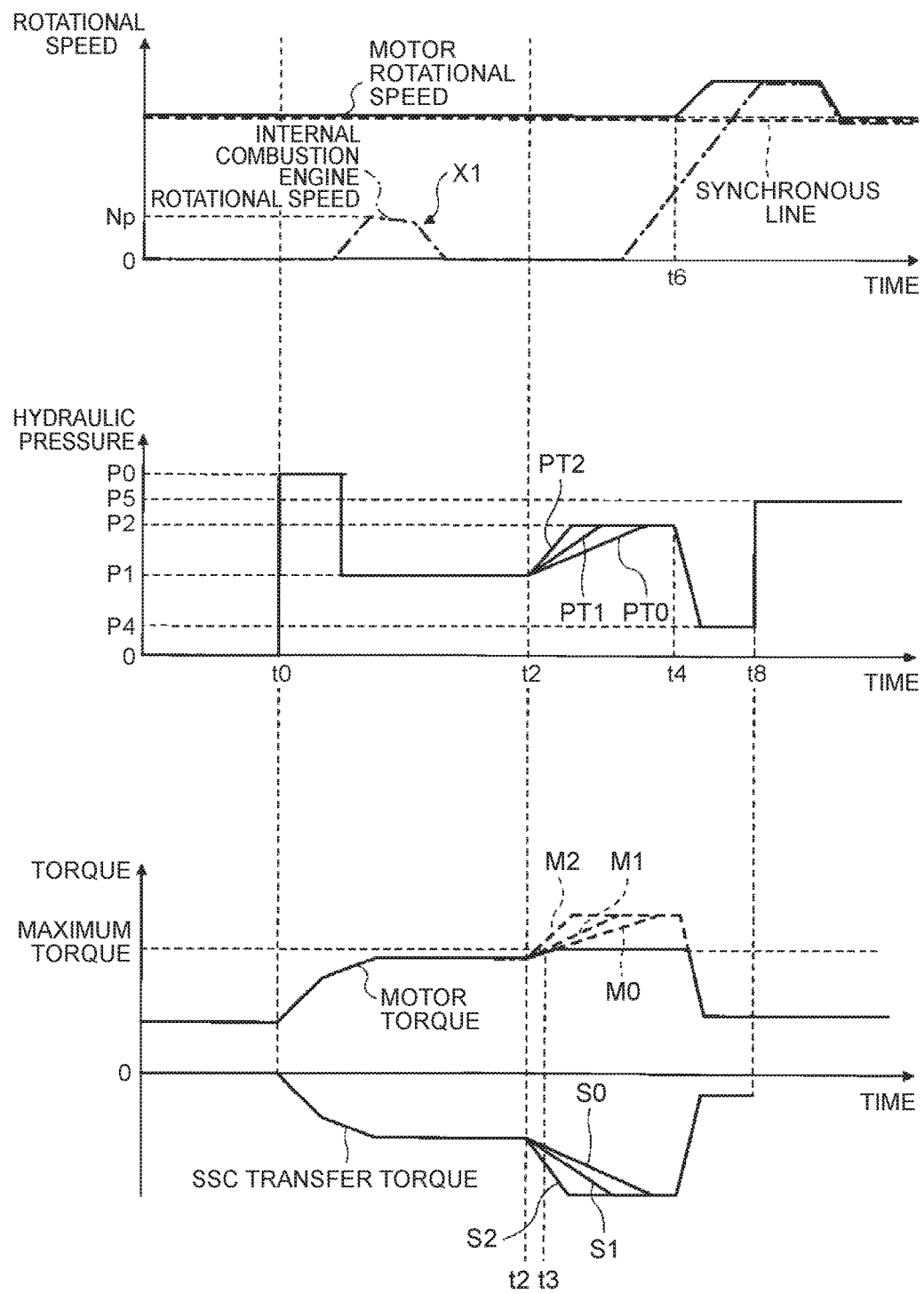
FIG. 13 is a timing chart of a first start assist process and the second start assist process according to the embodiment 2.

FIG. 13 is an explanatory diagram of the procedure illustrated in FIG. 9 and is a timing chart of the first start assist process and the second start assist process according to the embodiment 2. From the top, FIG. 13 illustrates a time series of a rotational speed, a time series of a hydraulic pressure, and a time series of a torque. As the time series of a rotational speed, the rotational speed of the internal combustion engine 2 (internal combustion engine rotational speed), the rotational speed of the rotating electrical machine 3 (motor rotational speed), and a synchronous line are illustrated. As the time series of a hydraulic pressure, a time series of the hydraulic command (engagement pressure) for the first engagement device 11 is illustrated in three patterns from PT0 to PT2. The patterns from PT0 to PT2 differ in the increasing gradient G2 from each other. The pattern PT0 represents a case where the increasing gradient G2 is determined to be $G2_0$, the pattern represents a case where the increasing gradient G2 is determined to be $G2_1$, and the pattern PT2 represents a case where the increasing gradient G2 is determined to be $G2_2$, where $G2_0<G2_1<G2_2$. As the time series of a torque, a time series of the torque generated by the rotating electrical machine 3 (motor torque) and a time series of the transfer torque capacity of the first engagement device 11 (SSC transfer torque) are each illustrated in three patterns. Each pattern corresponds to a difference (three patterns) in the second engagement pressure P2. For patterns from M0 to M2, a dotted line section represents a pattern before a correction to the maximum torque (step S612) is made. It is noted that for the transfer torque capacity of the first engagement device 11, a negative section until a time t8 (a section used to start the internal combustion engine 2) is illustrated.

The description for a section until a time t2 is the same as that already described with reference to FIG. 8.

At the time t2, the second start assist process is started (step S330). Here, as one example, the increasing gradient G2 is determined to be $G2_1$ (step S324), and the hydraulic command (engagement pressure) for the first engagement device 11 is increased toward the second engagement pressure P2 at the increasing gradient $G2_1$ (a pattern PT1). Accordingly, the transfer torque capacity of the first engagement device 11 increases at an increasing gradient corresponding to the increasing gradient $G2_1$ (refer to a pattern S1), so that the torque generated by the rotating electrical machine 3 is increased at an increasing gradient corresponding to the increasing gradient $G2_1$ (refer to a pattern M1).

The description for a section after a time t4 is the same as that already described with reference to FIG. 8.

In the example illustrated in FIG. 13, a torque that needs to be generated to fully compensate the transfer torque capacity of the first engagement device 11 corresponding to the second engagement pressure P2 exceeds the maximum torque generatable by the rotating electrical machine 3. Therefore, in the example illustrated in FIG. 13, at a time t3, a target torque for the rotating electrical machine 3 exceeds the maximum torque, and the target torque is corrected to the maximum torque (refer to step S612). Specifically, in the example illustrated in FIG. 13, when the increasing gradient G2 is equal to $G2_1$, the pattern M1 represents a torque that the rotating electrical machine 3 needs to generate to fully compensate the transfer torque capacity of the first engagement device 11. However, since the pattern M1 exceeds the maximum torque generatable by the rotating electrical machine 3, an amount exceeding the maximum torque is an uncompensable torque. As the uncompensable torque becomes larger, the likelihood of deceleration feel being caused becomes larger. On the point that the uncompensable torque becomes larger, the same is true for when the increasing gradient G2 is equal to $G2_0$, and for when the increasing gradient G2 is equal to $G2_2$ (refer to the pattern M0 and the pattern M2). In FIG. 13, the sections for uncompensable torque are each denoted by a dotted line.

As a torque shortfall, the torque uncompensated by the rotating electrical machine 3 affects an output that is transferred to the output shaft 5 (and the wheels 7) through the transmission 4. Specifically, as the present gear ratio of the transmission 4 becomes larger, the amount of reduction in output torque at the wheels 7 due to the torque uncompensated by the rotating electrical machine 3 (a torque shortfall) becomes larger. Thus, as the present gear ratio of the transmission 4 becomes larger, the likelihood of deceleration feel being caused due to the torque uncompensated by the rotating electrical machine 3 becomes larger.

In this regard, according to the procedure illustrated in FIG. 9, the second start assist processing unit 52B determines, on the basis of the present gear ratio of the transmission 4, the increasing gradient G2 in such a manner that the increasing gradient G2 becomes smaller as the gear ratio becomes larger. This allows the increasing gradient G2 to be small when the gear ratio is relatively large. Thus, when the transfer torque capacity of the first engagement device 11 corresponding to the second engagement pressure P2 is uncompensated by the torque generated by the rotating electrical machine 3, the increasing gradient of the transfer torque capacity of the first engagement device 11 is reduced so that deceleration feel can be reduced or prevented. As such, the procedure illustrated in FIG. 9 ensures a good startability of the internal combustion engine 2 while reducing or preventing deceleration feel.

The embodiment 2 described above can be combined with the embodiment 1 describe above. Specifically, as the manner determining process for the initial execution of the second start assist process, the second start assist processing unit 52B may determine the second engagement pressure P2 in such a manner that the second engagement pressure P2 becomes lower as the peak value of the rotational speed of the internal combustion engine 2 that has increased in the first start assist process becomes larger while determining the increasing gradient G2 in such a manner that the increasing gradient G2 becomes smaller as the gear ratio presently achieved by the transmission 4 becomes larger.

Embodiment 3

Next, an embodiment 3 is described with reference to FIG. 14. The embodiment 3 differs from the embodiment 1 and the embodiment 2 mainly in the manner determining process for the initial execution of the second start assist process. The following description is focused on the difference.

Although not illustrated in the drawings (refer to FIG. 2), a control device 50C according to the embodiment 3 includes the first start assist processing unit 51, a second start assist processing unit 52C, and the information acquiring unit 56.

FIG. 14 is a flowchart illustrating an example of a manner determining process for the initial execution of the second start assist process according to the embodiment 3. According to the embodiment 3, the start assist control illustrated in FIG. 3 is performed, and a procedure illustrated in FIG. 14 instead of the procedure illustrated in FIG. 4 is executed as the process of step S324 illustrated in FIG. 3.

In step S1400, the second start assist processing unit 52C calculates an extra amount $\Delta Trm1$ ($=Trm_{MAX}-Trm$) of a maximum torque $Trm_{MAX}$ (the maximum torque generatable by the rotating electrical machine 3) with respect to a torque Trm presently generated by the rotating electrical machine 3. The command value for a generated torque commanded by the internal combustion engine control device 60 or the present value of a target torque for the rotating electrical machine 3 can be used as the torque Trm presently generated by the rotating electrical machine 3.

In step S1402, the second start assist processing unit 52C determines whether the extra amount $\Delta Trm1$ calculated in step S1400 is greater than a maximum compensating torque $\Delta Trm_{MAX}$ by a predetermined margin α or more. The maximum compensating torque $\Delta Trm_{MAX}$ is a transfer torque capacity of the first engagement device 11 corresponding to when the second engagement pressure P2 is equal to the upper limit P2$_{max}$. The predetermined margin α is predetermined, for example, so that a possible increase (acceleration request) in the required drive force during execution of the second start assist process can be achieved by an increase in the torque generated by the rotating electrical machine 3. If the determination result is "YES", the process proceeds to step S1404; whereas if the determination result is "NO", the process proceeds to step S1406.

In step S1404, the second start assist processing unit 52C determines the second engagement pressure P2 to be the upper limit P2$_{max}$. At this time, the second start assist processing unit 52C can determine the increasing gradient G2 to be any value. For example, the second start assist processing unit 52C may determine the increasing gradient G2 to be an upper limit G2$_{max}$. After the procedure in step S1404 ends, the manner determining process for the initial execution of the second start assist process ends accordingly.

In step S1406, according to a manner similar to the process illustrated in FIG. 4, the second start assist processing unit 52C determines the second engagement pressure P2 on the basis of the peak value Np of the rotational speed of the internal combustion engine 2 in association with the first start assist process. At this time, the second start assist processing unit 52C can determine the increasing gradient G2 to be any value. For example, the second start assist processing unit 52C may determine the increasing gradient G2 to be the upper limit G2$_{max}$.

In step S1408, the second start assist processing unit 52C calculates, on the basis of the second engagement pressure P2 determined in step S1402, a compensating amount (compensating torque) $\Delta Trm$ of a torque that the rotating electrical machine 3 needs to generate to fully compensate the transfer torque capacity of the first engagement device 11 corresponding to the second engagement pressure P2.

In step S1410, a determination is made whether or not the extra amount $\Delta Trm1$ calculated in step S1400 is greater than or equal to the compensating torque $\Delta Trm$ calculated in step S1408. If the determination result is "YES", the process ends; whereas the determination result is "NO", the process proceeds to step S1412.

In step S1412, according to a manner similar to the process illustrated in FIG. 10, the second start assist processing unit 52C determines the increasing gradient G2 on the basis of the present gear ratio of the transmission 4. At this time, the second start assist processing unit 52C corrects the increasing gradient G2 determined in step S1406 to the increasing gradient G2 determined in step S1412.

The second engagement pressure P2 and the increasing gradient G2 determined in this way are used in step S330 illustrated in FIG. 3. The procedure in step S330 is the same as that already described above with reference to FIG. 6. However, the increasing gradient G2 determined in the process illustrated in FIG. 14 is used instead of a fixed value.

When the extra amount $\Delta Trm1$ of the rotating electrical machine 3 is relatively large, the process illustrated in FIG. 14 determines the second engagement pressure P2 to be the upper limit, thereby maximizing the startability of the internal combustion engine 2. Further, when the extra amount $\Delta Trm1$ of the rotating electrical machine 3 is not relatively large, it makes it possible to reduce or prevent deceleration feel while increasing the startability of the internal combustion engine 2. Specifically, when the peak value Np of the rotational speed of the internal combustion engine 2 in association with the first start assist process is relatively large, the second engagement pressure P2 is set to a lower value. This makes it possible to reduce the likelihood of the transfer torque capacity of the first engagement device 11 of being uncompensated by the torque generated by the rotating electrical machine 3 (i.e., the likelihood of deceleration feel being caused) during execution of the second start assist process. Further, when the transfer torque capacity of the first engagement device 11 corresponding to the second engagement pressure P2 is uncompensated by an increase in the torque generated by the rotating electrical machine 3, the increasing gradient of the transfer torque capacity of the first engagement device 11 is reduced. This makes it possible to reduce or prevent deceleration feel.

Although the embodiments have been described above, the embodiments are not limiting, and various modifications and changes are possible within the scope of the claim. The elements of the embodiments described above may be combined in whole or in part.

For example, according to the embodiments 2 and 3, the increasing gradient G2 is a constant gradient that causes the engagement pressure of the first engagement device 11 to increase linearly with respect to time, but the increasing gradient G2 may be defined by multiple gradient values that cause the engagement pressure of the first engagement device 11 to increase non-linearly with respect to time.

For the embodiments described above, the following are further disclosed. It is noted that effects described below may not be always achieved. Further, effects associated with features of dependent forms are effects according to the features and additional effects.

(1)

A control device (50, 50C) is adapted for a vehicle drive system (1) in which a first engagement device (11) and a rotating electrical machine (3) are provided in a power transfer path connecting an internal combustion engine (2) to wheels (7), performs start assist control for the internal combustion engine, and includes: a first start assist processing unit (51) that executes, when the first engagement device (11) is in a disengaged state, a first start assist process that brings the first engagement device (11) into slip engagement at a first engagement pressure (P1) while increasing a torque generated by the rotating electrical machine (3); and a second start assist processing unit (52, 52C) that executes, when the first start assist process fails to start the internal combustion engine (2), a second start assist process that increases an engagement pressure of the first engagement device (11) to a second engagement pressure (P2) higher than the first engagement pressure (P1) while increasing the torque generated by the rotating electrical machine (3), wherein the second start assist processing unit (52, 52C) determines the second engagement pressure (P2) on the basis of a rotational speed of the internal combustion engine (2) in the first start assist process.

According to the structure descried in (1), when the first engagement device (11) is in a disengaged state, the first start assist process can be executed so that the first engagement device (11) is brought into slip engagement at the first engagement pressure (P1), and when the first start assist process fails to start the internal combustion engine (2), the second start assist process can be executed. The second start assist process increases the engagement pressure of the first engagement device (11) to the second engagement pressure (P2) higher than the first engagement pressure (R1) while increasing the torque generated by the rotating electrical machine (3). Thus, when the first start assist process fails to start the internal combustion engine (2), the second start assist process can increase the startability of the internal combustion engine (2). Further, the second engagement pressure (P2) used in the second start assist process is determined based on the rotational speed of the internal combustion engine (2) in the first start assist process. This reduces the likelihood of the second engagement pressure (P2) becoming unnecessarily large, thus reducing or preventing an increase in the transfer torque capacity of the first engagement device (11) that causes deceleration feel. Specifically, although the likelihood of deceleration feel being caused increases with an increase in the second engagement pressure (P2) because the transfer torque capacity of the first engagement device (11) corresponding to the second engagement pressure (P2) may be uncompensated by the torque generated by the rotating electrical machine (3), the structure described in (1) reduces the likelihood.

(2)

In the control device (50, 50C) described in (1), the second start assist processing unit (52, 52C) determines the second engagement pressure (P2) in such a manner that the second engagement pressure (P2) becomes lower as the peak value of the rotational speed of the internal combustion engine (2) that has increased in the first start assist process becomes larger.

The structure described in (2) determines the second engagement pressure (P2) used in the second start assist process on the basis of the peak value of the rotational speed of the internal combustion engine (2) that has increased in the first start assist process, thus increasing the likelihood of the second engagement pressure (P2) being determined to be a minimum engagement pressure required to start the internal combustion engine (2). This is because the peak value of the rotational speed of the internal combustion engine (2) is highly correlated with the startability of the internal combustion engine (2).

(3)

In the control device (50, 50C) described in (1) or (2), increasing the torque generated by the rotating electrical machine (3) in the second start assist process includes controlling the rotating electrical machine (3) so that a target torque is generated, and the second start assist processing unit (52, 52C) determines the target torque on the basis of the transfer torque capacity of the first engagement device (11) corresponding to the second engagement pressure (P2).

The structure described in (3) allows the transfer torque capacity of the first engagement device (11) corresponding to the second engagement pressure (P2) to be compensated by the torque generated by the rotating electrical machine (3) during execution of the second start assist process.

(4)

In the control device (50, 50C) described in (3), a transmission (4) is provided between the rotating electrical machine (3) and the wheels (7) in the vehicle drive system (1), increasing the engagement pressure of the first engagement device (11) to the second engagement pressure (P2) in the second start assist process includes increasing the engagement pressure of the first engagement device (11) toward the second engagement pressure (P2) at a predetermined increasing gradient (G2), and when the target torque exceeds a maximum torque generatable by the rotating electrical machine (3), the second start assist processing unit (52, 52C) determines the increasing gradient (G2) on the basis of a gear ratio presently achieved by the transmission (4) in such a manner that the increasing gradient (G2) becomes smaller as the gear ratio becomes larger.

The structure described in (4) reduces or prevents inconvenience caused when the target torque exceeds the maximum torque generatable by the rotating electrical machine (3) (deceleration feel caused when the transfer torque capacity of the first engagement device (11) corresponding to the second engagement pressure (P2) is uncompensated by the torque generated by the rotating electrical machine (3)) in the structure in which the transfer torque capacity of the first engagement device (11) corresponding to the second engagement pressure (P2) is compensated by the torque generated by the rotating electrical machine (3). Specifically, the amount of torque uncompensated by the torque generated by the rotating electrical machine (3) is transmitted to the wheels in accordance with the gear ratio presently achieved by the transmission (4). The likelihood of deceleration feel being caused thus increases with an increase in the gear ratio because a torque shortfall is amplified and then transferred to the wheels. The structure described in (4), though, can reduce the likelihood.

(5)

A control device (50B) is adapted for a vehicle drive system (1) in which a first engagement device (11), a rotating electrical machine (3), and a transmission (4) are provided in a power transfer path connecting an internal combustion engine (2) to wheels (7), performs start assist control for the internal combustion engine (2), and includes: a first start assist processing unit (51) that executes, when the first engagement device (11) is in a disengaged state, a first start assist process that brings the first engagement device (11) into slip engagement at a first engagement pressure (P1) while increasing a torque generated by the rotating electrical machine (3); and a second start assist processing unit (52B) that increases, when the first start assist process fails to start the internal combustion engine (2), an engagement pressure of the first engagement device (11) toward a second engagement pressure (P2) higher than the first engagement pressure (P1) at a predetermined increasing gradient (G2) while increasing the torque generated by the rotating electrical machine (3), wherein the second start assist processing unit (52B) determines the increasing gradient (G2) on the basis of a gear ratio presently achieved by the transmission (4) in such a manner that the increasing gradient (G2) becomes smaller as the gear ratio becomes larger.

According to the structure descried in (5), when the first engagement device (11) is in a disengaged state, the first start assist process can be executed so that the first engagement device (11) is brought into slip engagement at the first engagement pressure (P1), and when the first start assist process fails to start the internal combustion engine (2), the second start assist process can be executed. The second start assist process increases the engagement pressure of the first engagement device (11) to the second engagement pressure (P2) higher than the first engagement pressure (P1) while increasing the torque generated by the rotating electrical machine (3). Thus, when the first start assist process fails to start the internal combustion engine (2), the second start assist process increases the startability of the internal combustion engine (2). Further, the increasing gradient (G2) toward the second engagement pressure (P2) used in the second start assist process is determined on the basis of the gear ratio presently achieved by the transmission (4) in such a manner that the increasing gradient (G2) becomes smaller as the gear ratio becomes larger. This reduces or prevents an increase in the transfer torque capacity of the first engagement device (11) at an increasing gradient that causes deceleration feel. Specifically, the transfer torque capacity of the first engagement device (11) corresponding to the second engagement pressure (P2) is compensable by the torque generated by the rotating electrical machine (3), but, for example, when the target torque exceeds the maximum torque generatable by the rotating electrical machine (3), the transfer torque capacity of the first engagement device (11) corresponding to the second engagement pressure (P2) may be uncompensated by the torque generated by the rotating electrical machine (3), and accordingly, deceleration feel may be caused. Since the amount of torque uncompensated by the torque generated by the rotating electrical machine (3) is transferred to the wheels in accordance with the gear ratio presently achieved by the transmission (4), the likelihood of deceleration feel being caused increases with an increase in the gear ratio because a torque shortfall is amplified and then transferred to the wheels. In this regard, according to the structure described in (5), the increasing gradient (G2) toward the second engagement pressure (P2) becomes smaller as the gear ratio becomes larger. Thus, even when the transfer torque capacity of the first engagement device (11) corresponding to the second engagement pressure (P2) is uncompensated by the torque generated by the rotating electrical machine (3), the likelihood of deceleration feel being caused can be reduced.

The present international application claims priority based on Japanese Patent Application No. 2015-067592, filed on Mar. 27, 2015, the entire contents of which are incorporated in the present international application herein by reference.

DESCRIPTION OF THE REFERENCE NUMERALS

1 VEHICLE DRIVE SYSTEM
2 INTERNAL COMBUSTION ENGINE
3 ROTATING ELECTRICAL MACHINE
4 TRANSMISSION
5 OUTPUT SHAFT
7 WHEEL
8 HYDRAULIC CONTROL DEVICE
11 FIRST ENGAGEMENT DEVICE
21 SECOND ENGAGEMENT DEVICE
31 to 33 ROTATIONAL SPEED DETECTING SENSOR
50, 50B, 50C CONTROL DEVICE
51 FIRST START ASSIST PROCESSING UNIT
52, 52B, 52C SECOND START ASSIST PROCESSING UNIT
56 INFORMATION ACQUIRING UNIT
60 INTERNAL COMBUSTION ENGINE CONTROL DEVICE

The invention claimed is:

1. A control device that is adapted for a vehicle drive system in which a first engagement device and a rotating electrical machine are provided in a power transfer path connecting an internal combustion engine to wheels and that performs start assist control for the internal combustion engine, the control device comprising:
an electronic control unit that:
executes, when the first engagement device is in a disengaged state, a first start assist process that brings the first engagement device into slip engagement at a first engagement pressure while increasing a torque generated by the rotating electrical machine; and
executes, when the first start assist process fails to start the internal combustion engine, a second start assist process that increases an engagement pressure of the first engagement device to a second engagement pressure higher than the first engagement pressure while increasing the torque generated by the rotating electrical machine, wherein
the second engagement pressure is determined on the basis of a rotational speed of the internal combustion engine in the first start assist process.

2. The control device according to claim 1, wherein
the electronic control unit determines the second engagement pressure in such a manner that the second engagement pressure becomes lower as a peak value of the rotational speed of the internal combustion engine that has increased in the first start assist process becomes larger.

3. The control device according to claim 2, wherein
increasing the torque generated by the rotating electrical machine in the second start assist process includes controlling the rotating electrical machine so that a target torque is generated, and
the electronic control unit determines the target torque on the basis of a transfer torque capacity of the first engagement device corresponding to the second engagement pressure.

4. The control device according to claim 3, wherein
a transmission is provided between the rotating electrical machine and the wheels in the vehicle drive system,
increasing the engagement pressure of the first engagement device to the second engagement pressure in the second start assist process includes increasing the engagement pressure of the first engagement device toward the second engagement pressure at a predetermined increasing gradient, and
when the target torque exceeds a maximum torque generatable by the rotating electrical machine, the electronic control unit determines the increasing gradient on the basis of a gear ratio presently achieved by the transmission in such a manner that the increasing gradient becomes smaller as the gear ratio becomes larger.

5. The control device according to claim 1, wherein
increasing the torque generated by the rotating electrical machine in the second start assist process includes controlling the rotating electrical machine so that a target torque is generated, and
the electronic control unit determines the target torque on the basis of a transfer torque capacity of the first engagement device corresponding to the second engagement pressure.

6. The control device according to claim 5, wherein
a transmission is provided between the rotating electrical machine and the wheels in the vehicle drive system,
increasing the engagement pressure of the first engagement device to the second engagement pressure in the second start assist process includes increasing the engagement pressure of the first engagement device toward the second engagement pressure at a predetermined increasing gradient, and
when the target torque exceeds a maximum torque generatable by the rotating electrical machine, the electronic control unit determines the increasing gradient on the basis of a gear ratio presently achieved by the transmission in such a manner that the increasing gradient becomes smaller as the gear ratio becomes larger.

7. A control device that is adapted for a vehicle drive system in which a first engagement device, a rotating electrical machine, and a transmission are provided in a power transfer path connecting an internal combustion engine to wheels and that performs start assist control for the internal combustion engine, the control device comprising:
an electronic control unit that:
executes, when the first engagement device is in a disengaged state, a first start assist process that brings the first engagement device into slip engagement at a first engagement pressure while increasing a torque generated by the rotating electrical machine; and
increases, when the first start assist process fails to start the internal combustion engine, an engagement pressure of the first engagement device toward a second engagement pressure higher than the first engagement pressure at a predetermined increasing gradient while increasing the torque generated by the rotating electrical machine, wherein
the electronic control unit determines the increasing gradient on the basis of a gear ratio presently achieved by the transmission in such a manner that the increasing gradient becomes smaller as the gear ratio becomes larger.

* * * * *